US012759910B2

(12) United States Patent
French

(10) Patent No.: US 12,759,910 B2
(45) Date of Patent: Oct. 13, 2026

(54) SYSTEM AND METHOD FOR DESALINATION

(71) Applicant: Steven James French, Santa Clarita, CA (US)

(72) Inventor: Steven James French, Santa Clarita, CA (US)

( * ) Notice: Subject to any disclaimer, the term of this patent is extended or adjusted under 35 U.S.C. 154(b) by 962 days.

(21) Appl. No.: 17/899,085

(22) Filed: Aug. 30, 2022

(65) Prior Publication Data

US 2023/0077171 A1 Mar. 9, 2023

Related U.S. Application Data

(60) Provisional application No. 63/254,507, filed on Oct. 11, 2021, provisional application No. 63/248,530, filed on Sep. 26, 2021, provisional application No. 63/238,776, filed on Aug. 31, 2021.

(51) Int. Cl.

| | |
|---|---|
| ***C02F 1/48*** | (2023.01) |
| ***C02F 103/00*** | (2006.01) |
| ***C02F 103/08*** | (2006.01) |

(52) U.S. Cl.
CPC ................ *C02F 1/484* (2013.01); *C02F 1/48* (2013.01); *C02F 2103/007* (2013.01); *C02F 2103/08* (2013.01)

(58) Field of Classification Search
None
See application file for complete search history.

(56) References Cited

U.S. PATENT DOCUMENTS

2004/0065614 A1 4/2004 Gordon et al.
2014/0299529 A1* 10/2014 Govind ................ C02F 1/4693 210/243
2017/0305765 A1* 10/2017 Trouve .................. C02F 1/4604

FOREIGN PATENT DOCUMENTS

JP 2008191084 A 8/2008

* cited by examiner

*Primary Examiner* — Ryan B Huang

(57) ABSTRACT

Systems and methods for desalinating a liquid are provided. A desalination system may include a main container and may be configured to provide at least one of an electric field or a magnetic field through the main container to control a distribution of ions in a liquid in the main container.

22 Claims, 15 Drawing Sheets

SYSTEM AND METHOD FOR DESALINATION

CROSS-REFERENCE TO RELATED APPLICATIONS

The present application claims priority to and the benefit of U.S. Provisional Application No. 63/238,776, filed Aug. 31, 2021, entitled "IONIC IMPURITY REMOVAL SYSTEM AND METHOD"; U.S. Provisional Application No. 63/248,530, filed Sep. 26, 2021, entitled "IONIC IMPURITY REMOVAL SYSTEM AND METHOD"; and U.S. Provisional Application No. 63/254,507, filed Oct. 11, 2021, entitled "IONIC IMPURITY REMOVAL SYSTEM AND METHOD", which are hereby incorporated by reference in their entireties.

FIELD

The present disclosure relates to systems and methods for desalinating a liquid.

BACKGROUND

Liquids, such as water, have various uses, and it is sometimes desirable to remove ionic impurities, such as salts, from the liquid. For example, fresh water has various uses, including personal consumption, agriculture, and cleaning. As the world's population grows and societies develop, demand for fresh water increases. However, natural sources of fresh water are limited while salt water is abundant and able to be desalinated to provide fresh water. Therefore, there is a need for improving desalination systems and methods.

SUMMARY

According to an example, a desalination system includes: a separable main container: having a first region and a second region fluidically coupled to the first region, and being configured to substantially fluidically separate the second region from the first region, wherein the desalination system further includes: an electrode configured, in response to the electrode holding a charge of a first charge type and the separable main container containing a liquid including ions, to cause a concentration of ions of a second charge type in the first region to be greater than a concentration of ions of the second charge type in the second region, or a conductor configured, in response to the conductor carrying an electric current, the separable main container containing a liquid including ions, and movement of the ions in the liquid, to cause a concentration of ions of a second charge type in the first region to be greater than a concentration of ions of the second charge type in the second region.

According to an example, a desalination method includes: providing at least one of an electric field or a magnetic field through a separable main container containing a liquid including ions, the separable main container having a first region and a second region fluidically coupled to the first region; causing, via the at least one of the electric field or the magnetic field, a concentration of ions of a first charge type in the first region to be greater than a concentration of ions of the first charge type in the second region; and controlling the main separable container to substantially fluidically separate the second region from the first region.

According to an example, a desalination system includes: a main passage: having a first region and a second region, and including a first section along a fluidic path of the main passage and a second section along the fluidic path of the main passage, wherein, in the first section of the main passage, the second region is fluidically coupled to the first region, wherein, in the second section of the main passage, the second region is substantially fluidically separated or substantially fluidically separable from the first region, and wherein the desalination system further includes: an electrode configured, in response to the electrode holding a charge of a first charge type and liquid including ions flowing through the main passage, to cause a concentration of ions of a second charge type in the first region to be greater than a concentration of ions of the second charge type in the second region, or a conductor configured, in response to the conductor carrying an electric current and liquid including ions flowing through the main passage, to cause a concentration of ions of a second charge type in the first region to be greater than a concentration of ions of the second charge type in the second region.

According to an example, a desalination method includes: providing at least one of an electric field or a magnetic field through a main passage, the main passage: having a first region and a second region, including a first section along a fluidic path of the main passage and a second section along the fluidic path of the main passage, wherein, in the first section, the second region is fluidically coupled to the first region and, in the second section, the second region is substantially fluidically separated or substantially fluidically separable from the first region, and containing a liquid flowing through the first section and through the second section in this order; and causing, via the at least one of the electric field or the magnetic field, a concentration of ions of a first charge type in the first region to be greater than a concentration of ions of the first charge type in the second region.

According to an example, a desalination system includes: a main container; a first passage fluidically coupled to the main container at a proximal end of the first passage; and a first electrode configured, in response to the first electrode holding a charge of a first charge type and the main container containing a liquid including ions, to be substantially electrically insulated from the liquid and to cause a concentration of ions of a second charge type in the first passage to be greater than an average concentration of ions of the second charge type in the main container.

According to an example, a desalination method includes moving, via an electric field, ions of a first charge type in a liquid in a main container into a first passage fluidically coupled to the main container at a proximal end of the first passage.

BRIEF DESCRIPTION OF THE DRAWINGS

Non-limiting and non-exhaustive examples are described with reference to the following figures.

DETAILED DESCRIPTION

Figure 1:
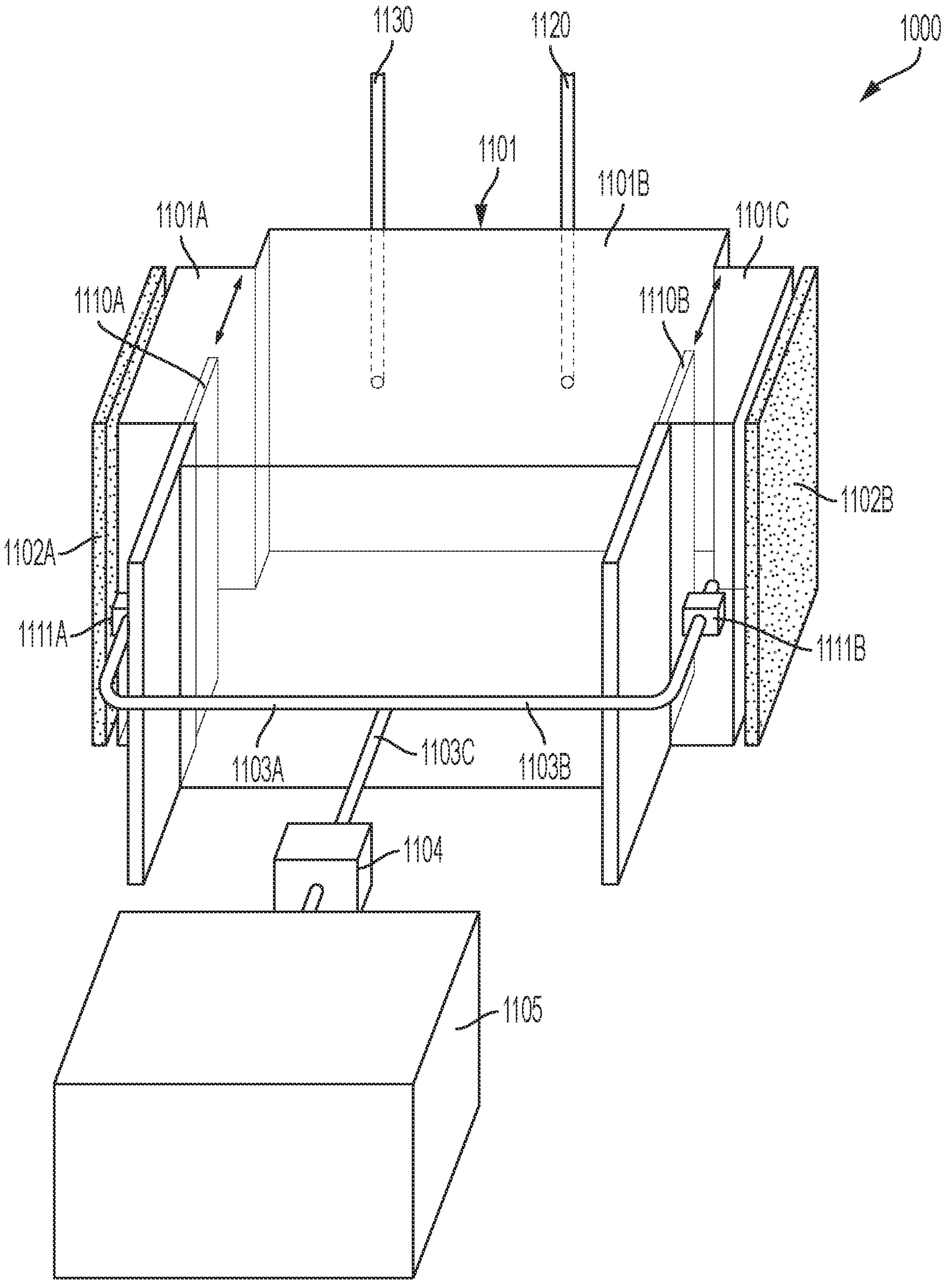
FIG. 1 depicts a perspective view of a desalination system according to some examples.

The present disclosure will now be described in more detail with reference to the accompanying drawings. In the drawings, the same or similar reference numerals refer to the same or similar elements throughout. In the drawings, some features may be illustrated schematically for ease of illustration and understanding. The drawings are not to scale.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the system in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The system may be otherwise oriented (e.g., rotated 90 degrees or at other orientations) and the spatially relative descriptors used herein should be interpreted accordingly. In addition, it will also be understood that when an element is referred to as being "between" two elements, it can be the only element between the two elements, or one or more intervening elements may also be present.

The terminology used herein is for the purpose of describing example embodiments only and is not intended to be limiting of the present disclosure. As used herein, the singular forms "a", "an" and "the" are intended to include the plural forms as well, unless the context clearly indicates otherwise. It will be further understood that the terms "comprises," "comprising," "includes," and "including," when used in this specification, specify the presence of stated features, integers, steps, processes operations, elements, and/or components, but do not preclude the presence or addition of one or more other features, integers, steps, processes operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. For example, the phrase "at least one of A, B, or C" may include only A, only B, only C, both A and B, both A and C, both A and C, and all of A, B, and C. Further, the use of "may" when describing embodiments of the present disclosure refers to "one or more embodiments of the present disclosure." As used herein, terms such as "at least part" and "at least partially" when describing embodiments of the present disclosure includes "part or all" and "at least partly or entirely," respectively, unless the context indicates otherwise.

It will be understood that when an element is referred to as being "on", "connected to", "coupled to", or "adjacent to" another element, it can be directly on, directly connected to, directly coupled to, or immediately adjacent to the other element, or one or more intervening element(s) may be present. In contrast, when an element is referred to as being "directly on," "directly connected to," "directly coupled to," or "immediately adjacent to" another element, there are no intervening elements or layers present.

As used herein, and unless the context indicates otherwise, the term "substantially" and similar terms are used as terms of approximation and not as terms of degree, and are intended to account for the inherent deviations in measured or calculated values that would be recognized by those of ordinary skill in the art. Also, the terms "about" and similar terms, when used herein in connection with a stated or implicit numerical value or a numerical range, are inclusive of the stated or implicit value and mean within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations, or within ±30%, 20%, 10%, 5% of the stated value.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As used herein, the terms "use," "using," and "used" may be considered synonymous with the terms "utilize," "utilizing," and "utilized," respectively.

All the features disclosed in this specification (including any accompanying claims, abstract, and drawings) may be replaced by comparable features serving the same, equivalent, or similar purpose, unless expressly stated otherwise. Thus, unless expressly stated otherwise, each feature disclosed is only one example of a generic series of equivalent or similar features. Similarly, unless indicated to the contrary, features of one embodiment may be incorporated into other embodiments without departing from the spirit and scope of the present disclosure.

FIG. 1 depicts a perspective view of a desalination system 1000 according to some examples.

The desalination system 1000 may include a main container 1101 having a first region 1101A, a second region 1101B, and a third region 1101C; an input passage 1120; an output passage 1130; a first electrode 1102A; a second electrode 1102B; a first passage 1103A; a second passage 1103B; a third passage 1103C; a pump 1104; and a drain reservoir 1105.

The main container 1101 may be configured to contain a liquid (e.g., water or another liquid). For example, the main container 1101 may generally be fluidically sealed such that it substantially does not leak water and receives and discharges liquid substantially only through passages or mechanisms respectively configured to provide liquid to the main container 1101 or to receive liquid from the main container 1101.

The input passage 1120 may be fluidically coupled to the main container 1101 and configured to provide a liquid for desalination to the main container 1101. For example, the liquid may be water taken (directly or indirectly) from any natural or artificial water source, such as oceans, seas, lakes, rivers, ponds, reservoirs, etc. The output passage 1130 may be fluidically coupled to the main container 1101 and configured to receive the liquid from the main container 1101 after the liquid has been at least partially desalinated. The output passage 1130 may be routed to provide the at least partially desalinated liquid to, for example, a clean water reservoir for public use, another liquid-processing system (e.g., another, or the same, desalination system), etc.

The first, second, and third regions 1101A, 1101B, and 1101C may each have any suitable shape. In some examples, at least one of the first region 1101A, the second region 1101B, or the third region 1101C may be a chamber within the main container 1101, but the present disclosure is not limited thereto. The main container 1101 may be a separable main container that is configured to substantially fluidically separate (e.g., seal off) the second region 1101B from the first region 1101A and from the third region 1101C. For example, the main container 1101 may include at least one fluidic separation mechanism that is controllably able to substantially fluidically separate and connect the second region 1101B from the first region 1101A and from the third region 1101C. For example, the fluidic separation mechanism may be positionable in at least a closed configuration whereby the second region 1101B is substantially fluidically separated from the first region 1101A and from the third region 1101C, and an opened configuration whereby the second region 1101B is fluidically coupled to the first region 1101A and to the third region 1101C. The fluidic separation mechanism may be controllably moved between the opened configuration and the closed configuration. For example, the fluidic separation mechanism may be electrically coupled to a control circuit or controller (e.g., in one or more computers and/or other electronic devices) configured to control at least some operations (e.g., upon executing computer-readable instructions for the operations and stored in a memory) of the desalination system 1000 disclosed herein, including the fluidic separation mechanism. In some examples, the fluidic separation mechanism is configured to independently substantially fluidically separate the second region 1101B from the first region 1101A and substantially fluidically separate the second region 1101B from the third region 1101C. In some examples, the fluidic separation mechanism may include one or more fluidic separating doors, which may include one or more movable (e.g., rotatable, slidable, etc.) walls, planes of material, valves, etc. The one or more fluidic separating doors may be independently controllable.

In the non-limiting and non-exhaustive example shown in FIG. 1, the main container 1101 includes a first slidable door 1110A controllably configured to substantially fluidically separate the second region 1101B from the first region 1101A, and a second slidable door 1110B controllably configured to substantially fluidically separate the second region 1101B from the third region 1101C. When the first and second slidable doors 1110A and 1110B are in their respective closed positions, the first region 1101A and the third region 1101C may be substantially fluidically separated from each other. The first and second slidable doors 1110A and 1110B may slide into compartments configured (e.g., shaped and sized) to house the first and second slidable doors 1110A and 1110B when the fluidic separation mechanism moves from the closed position to the opened position. In some examples, a first plurality of controllable doors may be configured to move toward each other and/or to move together to substantially fluidically separate the second region 1101B from the first region 1101A, and a second plurality of controllable doors may be configured to move toward each other and/or to move together to substantially fluidically separate the second region 1101B from the third region 1101C. In some examples, the main container 1101 may be configured to substantially fluidically separate the second region 1101B from the first region 1101A and from the third region 1101C in such a manner that the first region 1101A and the third region 1101C are fluidically coupled. For example, when the fluidic separation mechanism is in the closed configuration, the first region 1101A may be fluidically coupled to the third region 1101C, or the fluidic separation mechanism may be further controllably positionable, while in the closed configuration, to fluidically couple and substantially fluidically separate the first region 1101A from the third region 1101C.

In some examples, the fluidic separation mechanism is configured to form, in a closed configuration, a U-shaped region partially surrounding the second region 1101B and substantially fluidically separated from the second region, wherein the U-shaped region includes the first region 1101A along one of the two arms of the U-shape, the third region 1101C along the other one of the two arms of the U-shape, and a passage region forming the base of the U-shape between the first and third regions 1101A and 1101C and either fixedly fluidically coupling the first and third regions 1101A and 1101C or controllable to fluidically couple or substantially fluidically separate the first region 1101A and the third region 1101C. In some other examples, the fluidic separation mechanism may be configured such that, when it is in the closed configuration, one or more fluidic passages are provided to fixedly fluidically couple, or controllably fluidically couple and substantially fluidically separate, the first region 1101A from the third region 1101C.

In some examples, the main container 1101 does not include a membrane (e.g., filter membrane) in at least one of (e.g., all of) the first region 1101A, the second region 1101B, or the third region 1101C. In some examples, a continuous path (e.g., virtual line) between the first and third regions 1101A and 1101C and entirely within the main container 1101 is definable such that the continuous path does not pass through a membrane (i.e., does not pass through a material of a membrane or through a pore of the membrane). Because filter membranes need to replaced after becoming fouled, contaminated, torn, or otherwise degraded or rendered unusable, a desalination system that is operable without filter membranes is desirable. However, in some examples, one or more filter membranes may nonetheless be provided in the main container 1101 for various purposes, such as to collect non-ionic contaminants.

The first electrode 1102A may be configured (e.g., positioned, positionable, shaped, and/or sized), in response to the first electrode 1102A holding a charge of a first charge type or kind (e.g., one of a positive charge or a negative charge) and the main container 1101 containing a liquid including ions (e.g., sodium (Na) ions, chloride (Cl) ions, etc.), to cause a concentration of ions of a second charge type or kind (e.g., the other one of the positive charge or the negative charge) in the first region 1101A to be greater than a concentration of ions of the second charge type in the second region 1101B and in the third region 1101C, and/or to cause a concentration of ions of the first charge type in the third region 1101C to be greater than a concentration of ions of the first charge type in the second region 1101B and in the first region 1101A. As used herein, the term "concentration" includes average concentration unless the context indicates otherwise. In some examples, the concentration of the ions of the second charge type in the second region 1101B may be greater than the concentration of the ions of the second charge type in the third region 1101C, the concentration of ions of the second charge type in the first region 1101A may be greater than the average concentration of ions of the second charge type in the main container 1101, the ions of the first charge type in the second region 1101B may be greater than the concentration of ions of the first charge type in the first region 1101A, and/or the concentration of the ions of the first charge type in the third region 1101C may be greater than the average concentration of ions of the first charge type in the main container 1101.

The second electrode 1102B may be configured (e.g., positioned, positionable, shaped, and/or sized), in response to the second electrode 1102B holding a charge of the second charge type and the main container 1101 containing the liquid including ions, to cause a concentration of ions of the first charge type in the third regions 1101C to be greater than a concentration of ions of the first charge type in the second region 1101B and in the first region 1101A, and/or to cause a concentration of ions of the second charge type in the first region 1101A to be greater than a concentration of ions of the second charge type in the second region 1101B and in the third region 1101C. In some examples, the concentration of the ions of the first charge type in the second region 1101B may be greater than a concentration of the ions of the first charge type in the first region 1101A, the concentration of the ions of the first charge type in the third region 1101C may be greater than an average concentration of ions of the first charge type in the main container 1101, the ions of the second charge type in the second region 1101B may be greater than a concentration of the ions of the second charge type in the third region 1101C, and/or the concentration of the ions of the second charge type in the first region 1101A may be greater than an average concentration of ions of the second charge type in the main container 1101.

For example, in the non-limiting and non-exhaustive example shown in FIG. 1, the second region 1101B is positioned between the first region 1101A and the third region 1101C, the first electrode 1102A is positioned outside of the main container 1101 and adjacent to the first region 1101A, and the second electrode 1102B is positioned outside the main container 1101 and adjacent to the third region 1101C. In response to, for example, the first electrode 1102A holding a positive charge and the second electrode 1102B holding a negative charge, the first and second electrodes 1102A and 1102B may create an electric field in the main container 1101 that causes $Cl^-$ ions to move towards the first electrode 1102A (and into the first region 1101A) and $Na^+$ ions to move towards the second electrode 1102B (and into the third region 1101C). This creates distributions of the $Cl^-$ ions and of the $Na^+$ ions such that a concentration of the $Cl^-$ ions in the first region 1101A is greater than a concentration of the $Cl^-$ ions in the second region 1101B and in the third region 1101C, and such that a concentration of the $Na^+$ ions in the third region 1101C is greater than a concentration of the $Na^+$ ions in the second region 1101B and in the first region 1101A.

The second region 1101B may be fluidically coupled to the first and third regions 1101A and 1101C to allow the concentration of the ions of the second charge type in the first region 1101A to increase and to allow the concentration of the ions of the first charge type in the third region 1101C to increase. For example, the fluidic separation mechanism of the main container 1101 may be in an opened configuration for a set period of time after the charges of the first and second types are respectively applied to the first and second electrodes 1102A and 1102B and/or after the first and second electrodes 1102A and 1102B are controllably moved into position respectively adjacent to the first and third regions 1101A and 1101C. The fluidic separation mechanism may then be moved into the closed configuration to substantially fluidically separate the second region 1101B from the first region 1101A and from the third region 1101C.

Because of the increased concentrations of the ions of the second and first charge types respectively in the first and third regions 1101A and 1101C, the average salinity of the portion of the liquid in the second region 1101B may be lower than the average salinity of the liquid in the main container 1101 (e.g., the salinity of the liquid when initially received into the main container 1101). At least a portion of the liquid in the second region 1101B may be removed from the main container 1101, for example, through the output passage 1130. The liquid in the first and third regions 1101A and 1101C may be combined and removed from the main container 1101. For example, the fluidic separation mechanism may be moved to the opened configuration to allow the liquid in the first and third regions 1101A and 1101C to recombine in the main container 1101, and the high-salinity recombined liquid may be discharged out of the main container 1101 through a passage (e.g., a passage configured to discharge the high-salinity recombined liquid to the drain reservoir 1105). In some examples, the liquid in the first and third regions 1101A and 1101C may be recombined through the first and second passages 1103A and 1103B. For example, the first and second passages 1103A and 1103B may be fluidically coupled to the third passage 1103C at respective distal ends of the first and second passages 1103A and 1103B (e.g., combine to form the third passage 1103C), or fluidically coupled to a drain reservoir 1105 at the respective distal ends of the first and second passages 1103A and 1103B. In the non-limiting and non-exhaustive example depicted, the first and second passages 1103A and 1103B combine to form the third passage 1103C, and the third passage 1103C is fluidically coupled to the drain reservoir 1105.

The drain reservoir 1105 may be, for example, an ocean, a sea, a lake, a river, an artificial reservoir such as a temporary reservoir in a desalination facility, etc.

A pump 1104 may be configured to pump the liquid from the main container 1101 through the first, second, and third passages 1103A, 1103B, and 1103C into the drain reservoir 1105. In the non-limiting and non-exhaustive example depicted, one pump is depicted. In other examples, a plurality of pumps may be provided. The one or more pumps may include any suitable type of pumps.

First and second passage fluidic separation mechanisms 1111A and 1111B may be configured to respectively controllably fluidically couple and substantially fluidically separate the first and third regions 1101A and 1101C from the first and second passages 1103A and 1103B. In some examples, the first and second passage fluidic separation mechanisms 1111A and 1111B may each include one or more controllable doors (e.g., valves). In some examples, the first and second passage fluidic separation mechanisms 1111A and 1111B may be part of the fluidic separation mechanism of the main container 1101, and, when the fluidic separation mechanism of the main container 1101 is in the closed configuration, the first and third regions 1101A and 1101C may be fluidically coupled to each other through the first and second passages 1103A and 1103B. In some other examples, the first and second passage fluidic separation mechanisms 1111A and 1111B are not included. A third passage fluidic separation mechanism may be provided along the third passage 1103C so that the first and third regions 1101A and 1101C can be fluidically coupled together but substantially fluidically separable from at least part of the third passage 1103C and the drain reservoir 1105, even when the fluidic separation mechanism of the main container 1101 is in the closed configuration.

The main container 1101 may be a fluidically closed container or a container that is configured for the liquid to flow through the container. A container that is configured for the liquid to flow through the container during the desalination process may include a passage such as a channel, a duct, a pipe, etc. A fluidically closed container may refer to a container that is not configured for the liquid to flow through the container during the desalination process. For example, the fluidically closed container may be substantially sealed at least at the bottom and at the sides (and, in some examples, at the top), except for through passages configured to provide liquid to the container or receive liquid from the container and that may be controllably closable to substantially fluidically separate the passages from the container during at least part of the desalination process. In the non-limiting and non-exhaustive example depicted, the main container 1101 is a fluidically closed container. In some other examples, the main container 1101 may be configured for the liquid to flow through the container during the desalination process and may include a main passage, such as is shown FIG. 6. In some such examples, the first and third regions may be at sides (e.g., in compartments positioned at sides) of the main passage.

The first and second electrodes 1102A and 1102B may each be at least partially electrically insulated and/or substantially electrically insulated from the interior of the main container 1101 (e.g., from the liquid in the main container 1101). For example, the first and second electrodes 1102A and 1102B may be at least partially coated with an insulation layer, or an insulation material may be provided between the first and second electrodes 1102A and 1102B and the interior of the main container 1101 so that the first and second electrodes 1102A and 1102B are capacitively coupled to the interior of the main container 1101. By electrically insulating the first and second electrodes 1102A and 1102B from the interior of the main container 1101, redox reactions between the first and second electrodes 1102A and 1102B and the liquid in the main container 1101 during the desalination process may be reduced or substantially prevented. Reducing redox reactions can reduce or avoid deterioration of the electrodes and prolong their usable lifespan.

Because net charges may form in regions (e.g., in the first and third regions 1101A and 1101C) of the main container 1101, at least some (e.g., all) of internal walls of the main container 1101 may be formed of, or coated with, an electrically insulating material in order to reduce or avoid potentially dangerous electrical discharges and/or reactions between ions in the liquid in the main container 1101 and the internal walls of the main container 1101. In some examples, internal walls of passages configured to receive liquid holding a change, for example, the first and second passages 1103A and 1103B in some examples, may also be at least partially electrically insulated in a same or similar manner.

In the non-limiting and non-exhaustive example depicted, the first and second electrodes 1102A and 1102B are fixedly positioned outside of the main container 1101 and respectively adjacent to the first and third regions 1101A and 1101C. During the desalination process, first type and second type charges may be controllably applied to and removed from the first and second electrodes 1102A and 1102B, respectively. In some examples, the first and second electrodes 1102A and 1102B may be controllable positionable (e.g., controllably movable) relative to the main container 1101. First type and second type charges may therefore be applied to the first and second electrodes 1102A and 1102B, respectively, and the first and second electrodes 1102A and 1102B may be controllably brought into proximity with, and removed from proximity with, the main container 1101 in order to control the ion distributions inside the liquid in the main container 1101. In some examples, the first and second electrodes 1102A and 1102B are fixedly positioned or positionable at least partially (e.g., entirely) inside the main container 1101 (e.g., respectively inside the first and third regions 1101A and 1101C), and the first and second electrodes 1102A and 1102B are coated with an electrically insulating material in order to substantially electrically insulate the first and second electrodes 1102A and 1102B from the interior of the main container 1101.

In the non-limiting and non-exhaustive example depicted, the desalination system is shown as including two electrodes, but the present disclosure is not limited thereto. In some examples, the desalination system may include only one electrode (e.g., just the first electrode 1102A or just the second electrode 1102B) or more than two electrodes. For example, the main container 1101 may be a main passage, a plurality of first electrodes may be positioned along a first side of the main passage, and a corresponding plurality of second electrodes may be positioned along a second side of the main passage (e.g., a second side opposite to the first side).

The first and second electrodes 1102A and 1102B may each be configured to hold any suitable charge and/or, individually or collectively, to create an electric field or voltage having any suitable magnitude. For example, in some examples, the first and second electrodes 1102A and 1102B may be configured to hold respective charges such that a voltage between the first and second electrodes 1102A and 1102B is above or below the decomposition voltage of sea water (e.g., above or below about 1.23 volts, for example, at least about 2 volts, at least about 5 volts, at least about 10 volts, at least about 20 volts, at least about 50 volts, at least about 100 volts, at least about 500 volts, at least about 1000 volts, at least about 10,000 volts, at least about 100,000 volts, or at least about 1,000,000 volts). An electric field provided in the main container 1101 and having a large magnitude may cause the ions in the liquid in the main container 1101 to redistribute faster in response to the electric field compared to an electric field having a smaller magnitude.

In the non-limiting and non-exhaustive example depicted, the desalination system utilizes charged electrodes to control ion distributions in a liquid in the main container 1101. In some other examples, a magnetic field is utilized to control ion distributions in the liquid in the main container 1101. For example, the desalination system may include a conductor (e.g., a wire, such as a coil) that is configured, in response to the conductor carrying an electric current, the main container 1101 containing a liquid including ions, and the ions being controllably moved within the main container 1101, to cause a concentration of ions of a second charge type in the first region 1101A to be greater than a concentration of ions of the second charge type in the second region 1101B, and to cause a concentration of ions of a first charge type in the third region 1101C to be greater than a concentration of ions of the first charge type in the second region 1101B. Because charged particles respond to a magnetic field when in motion, the ions in the liquid may be be controllably moved to cause them to react to the magnetic field. In some examples, the ions may be controllably moved utilizing one or more charged electrodes that create an electric field and/or by causing the liquid (and thus the ions in the liquid) to flow through the main container 1101 (e.g., such as in examples where the main container includes a main passage).

Figure 2:
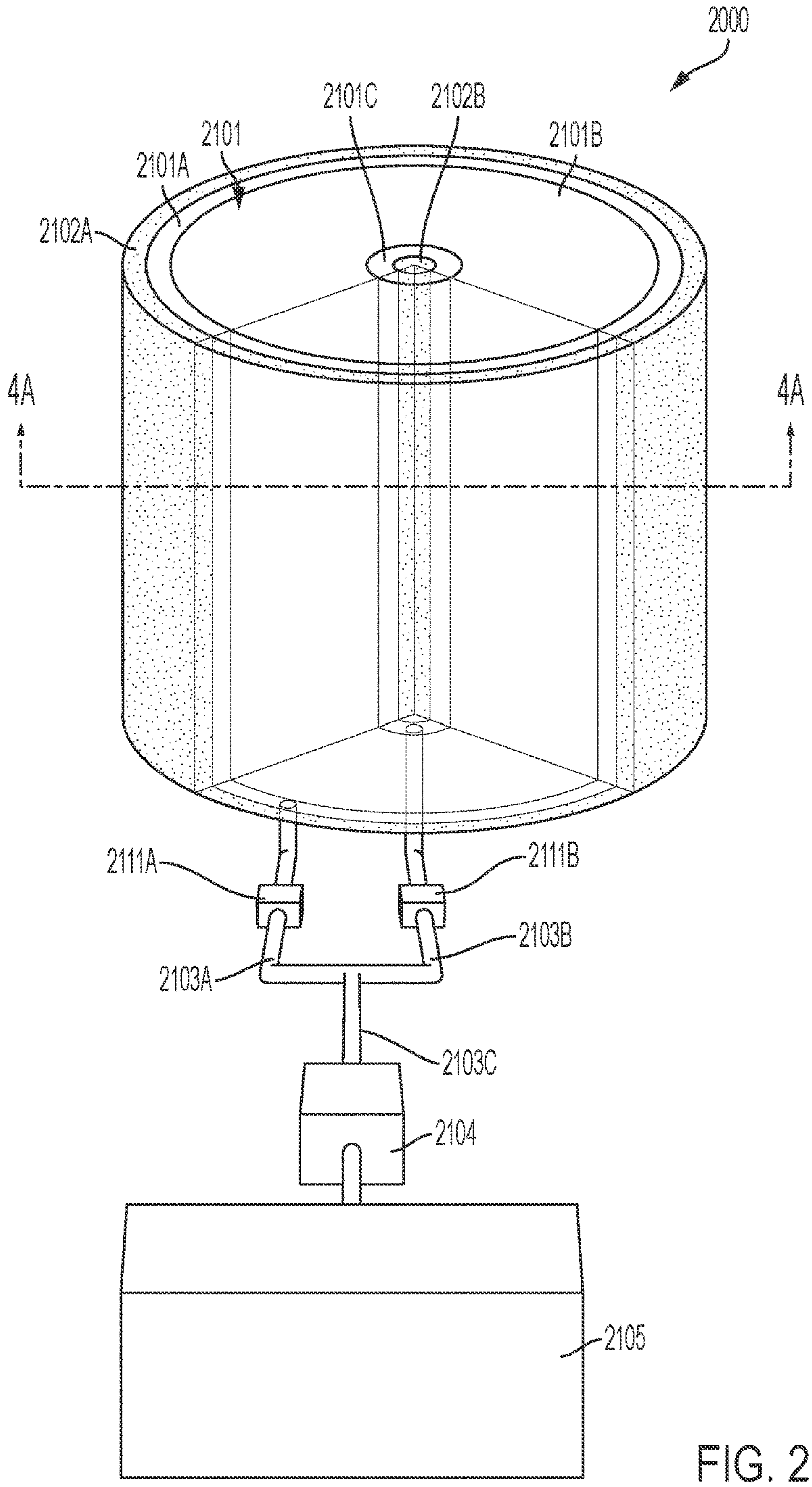
FIG. 2 depicts a perspective view of another desalination system according to some examples.
Figure 3:
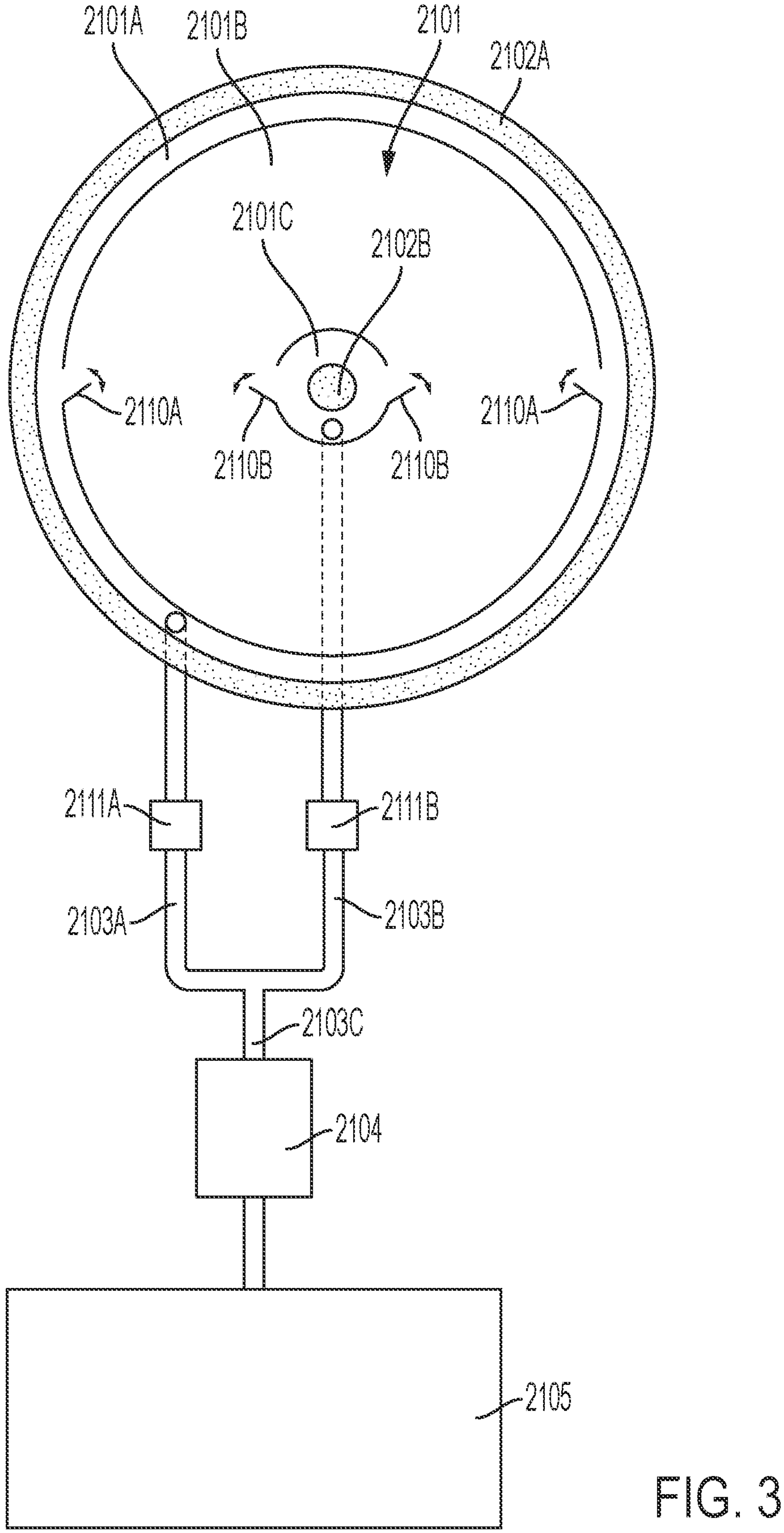
FIG. 3 depicts a top-down view of the desalination system of FIG. 2.
Figure 4:
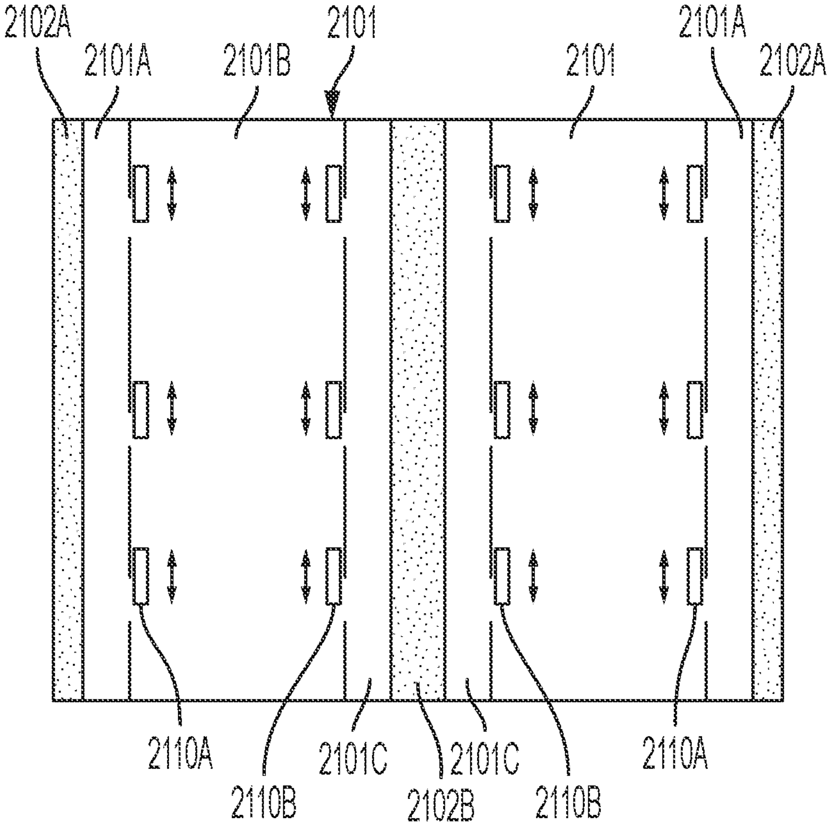
FIG. 4 depicts a cross-sectional view of part of the desalination system of FIG. 2 along line 4A-4A in FIG. 2.

FIG. 2 depicts a perspective view of another desalination system 2000 according to some examples. FIG. 3 depicts a top-down view of the desalination system 2000 of FIG. 2. FIG. 4 depicts a cross-sectional view of the desalination system 2000 of FIG. 2 along line 4A-4A in FIG. 2.

Referring concurrently to FIGS. 2-4, the desalination system 2000 may include some features similar to, or the same as, the features of other desalination systems illustrated and described herein, for example, of the desalination system 1000 illustrated in, and described with respect to, FIG. 1. Accordingly, redundant descriptions may not be repeated. The desalination system 2000 may include a main container 2101 (e.g., a separable main container) having a first region 2101A, a second region 2101B, and a third region 2101C; a first electrode 2102A; a second electrode 2102B; a first passage 2103A; a second passage 2103B; a third passage 2103C; a first passage fluidic separation mechanism 2111A; a second passage fluidic separation mechanism 2111B; a pump 2104; and a drain reservoir 2105.

The second electrode 2102B may have a columnar shape (e.g., a cylindrical shape) extending at least partially through the third region 2101C. The third region 2101C may at least partially surround the second electrode 2102B and have a columnar shape (e.g., a cylindrical shape) having a hollow center occupied at least partially by the second electrode 2102B. The second region 2101B may at least partially surround the third region 2101C and have a columnar shape (e.g., a cylindrical shape) having a hollow center occupied at least partially by the third region 2101C and the second electrode 2102B. The first region 2101A may at least partially surround the second region 2101B and have a columnar shape (e.g., a cylindrical shape) having a hollow center occupied at least partially by the second region 2101B, the third region 2101C, and the second electrode 2102B. The first electrode 2102A may at least partially surround the first region 2101A and have a columnar shape (e.g., a cylindrical shape) having a hollow center occupied at least partially by the first region 2101A, the second region 2101B, the third region 2101C, and the second electrode 2102B.

A first wall (e.g., having a columnar or cylindrical shape) may be between the second region 2101B and the first region 2101A, and the second region 2101B may be fluidically coupled to the first region 2101A by one or more openings (e.g., holes, gaps, etc.) in the first wall. A second wall (e.g., having a columnar or cylindrical shape) may be between the second region 2101B and the third region 2101C, and the second region 2101B may be fluidically coupled to the third region 2101C by one or more openings (e.g., holes, gaps, etc.) in the second wall. The main container 2101 may include a fluidic separation mechanism configured to controllably substantially fluidically separate the second region 2101B from the first and third regions 2101A and 2101C. The fluidic separation mechanism may include one or more controllable first doors 2110A configured to respectively substantially fluidically close (e.g., seal) the one or more openings in the first wall, and one or more controllable second doors 2110B configured to respectively substantially fluidically close (e.g., seal) the one or more openings in the second wall. FIGS. 3 and 4 show slightly different examples. The one or more first doors 2110A and the one or more second doors 2110B shown in FIG. 3 are rotatable (e.g., about a hinge) and are configured to open and close at least in part by rotation, while the one or more first doors 2110A and the one or more second doors 2110B shown in FIG. 4 are linearly translatable and are configured to open and close at least in part by linear translation. The features of the examples shown in FIGS. 3 and 4 are otherwise the same or similar.

Figure 5:
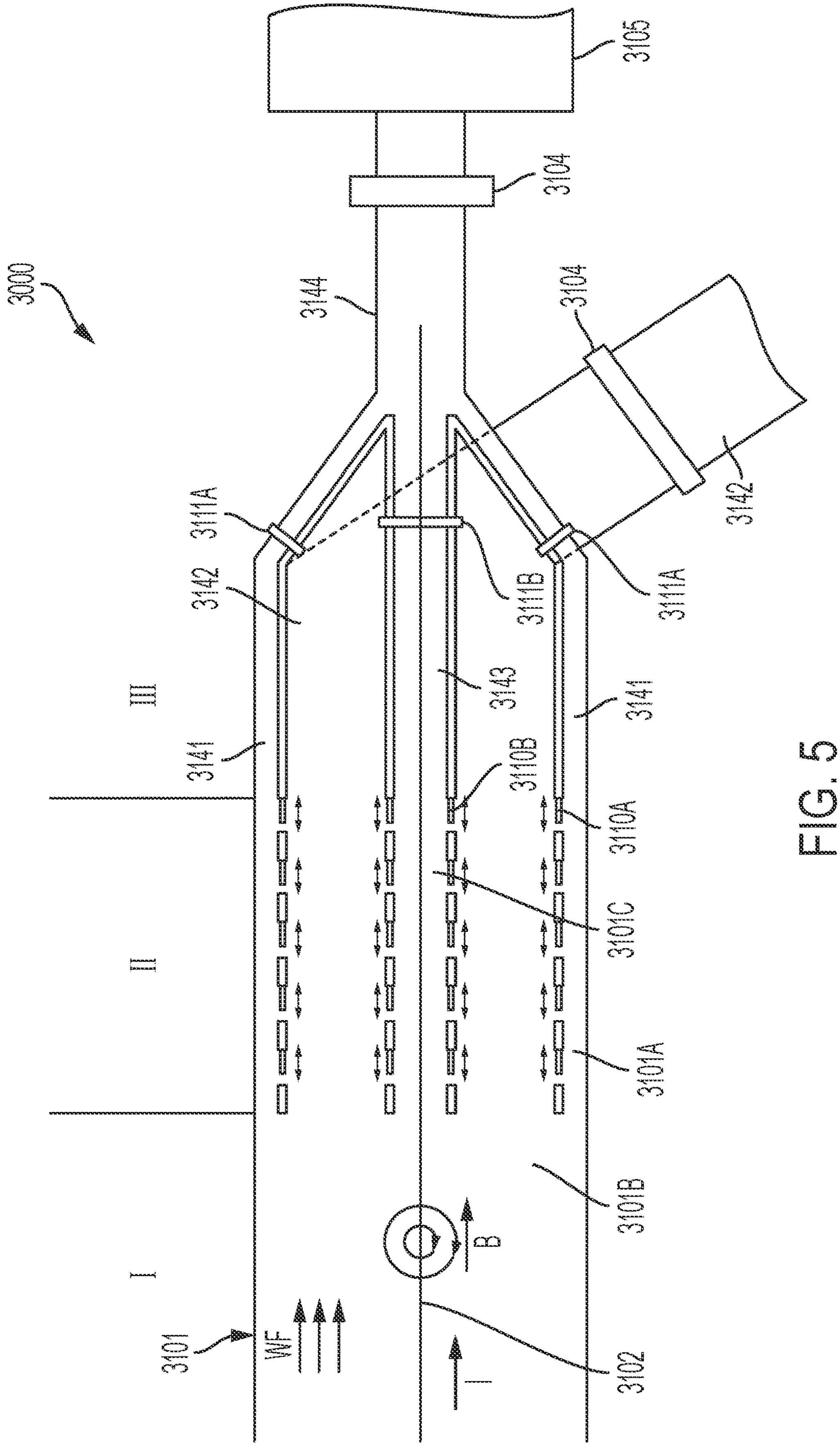
FIG. 5 depicts another desalination system according to some examples.

FIG. 5 depicts another desalination system 3000 according to some examples. The desalination system 3000 may include some features similar to, or the same as, the features of other desalination systems illustrated and described herein, for example, of the desalination system 1000 illustrated in, and described with respect to, FIG. 1. Accordingly, redundant descriptions may not be repeated. The desalination system 3000 includes a main passage 3101 that has a first region 3101A, a second region 3101B, and a third region 3101C, and includes a first section I along a fluidic path of the main passage 3101, a second section II along the fluidic path of the main passage 3101, and a third section III along the fluidic path of the main passage 3101. The main passage 3101 may be configured for liquid to flow through the main passage 3101, for example, through the first section I, the second section II, and the third section III in this stated order. The first, second, and third regions 3101A, 3101B, and 3101C may be defined in each of the first section I, the second section II, and the third second III.

In the non-limiting and non-exhaustive example depicted, the third region 3101C occupies at least part of a central region of the main passage 3101, the second region 3101B at least partially surrounds the third region 3101C in the main passage 3101, and the first region 3101A at least partially surrounds the second region 3101B. The first, second, and third regions 3101A, 3101B, and 3101C may each have a columnar (e.g., cylindrical) shape that extends along the fluidic path of the main passage 3101 and is at least partially hollow. For example, at least part of a hollow interior of the columnar shape of the third region 3101C may be occupied by a conductor 3102 or an electrode (see FIG. 6), at least part of the hollow interior of the columnar shape of the second region 3101B may be occupied by the third region 3101C and the conductor 3102 or the electrode, and at least part of the hollow interior of the columnar shape of the first region 3101A may be occupied by the second region 3101B, the third region 3101C, and the conductor 3102 or the electrode.

In the first section I, the second region 3101B may be fluidically coupled to the first region 3101A and the third region 3101C. For example, there may be no barriers or walls dividing the second region 3101B from the first region 3101A and the third region 3101C. In some other examples, one or more walls may be provided in the first section I of the main passage 3101 to partially separate the second region 3101B from the first and third regions 3101A and 3101C, but the one or more walls in the first section I may have one or more openings to fluidically couple the second region 3101B to the first and third regions 3101A and 3101C. The one or more openings may be either fixedly open or controllably closeable and openable by fluidic separation mechanisms. In the non-limiting and non-exhaustive example depicted, no internal walls are provided in the first section I.

In the second section II, the second region 3101B may be substantially fluidically separable from the first region 3101A and from the third region 3101C by a fluidic separation mechanism. The first, second, and third regions 3101A, 3101B, and 3101C in the second section II may be respectively fluidically coupled to the first, second, and third regions 3101A, 3101B, and 3101C in the first section I and to the first, second, and third regions 3101A, 3101B, and 3101C in the third section III. Therefore, the second region 3101B in the second section II may be indirectly fluidically coupled to first and third regions 3101A and 3101C through the first section I. However, when the second region 3101B is substantially fluidically separated from the first and third regions 3101A and 3101C in the second section II, a fluidic path that is only within the second section II and that extends between the second region 3101B and the first region 3101A may not be definable, and a fluidic path that is only within the second section II and that extends between the second region 3101B and the third region 3101C may not be definable. Therefore, in the context of "in the second section II", the second region 3101B may be substantially separable from the first and third regions 3101A and 3101C, for example, by a fluid separation mechanism.

In some examples, in the second section II, one or more first walls may be between the second region 3101B and the first region 3101A and have one or more openings fluidically coupling the second region 3101B to the first region 3101A, and one or more second walls may be between the second region 3101B and the third region 3101C and have one or more openings fluidically coupling the second region 3101B to the third region 3101C. The main passage 3101 may include a controllable fluidic separation mechanism configured to substantially fluidically close (e.g., seal) the one or more openings in the one or more first walls and the one or more openings in the one or more second walls. In the non-limiting and non-exhaustive example depicted, the fluidic separation mechanism includes one or more controllable first doors 3110A to fluidically open and close one or more openings in a first wall and one or more controllable second doors 3110B to fluidically open and close one or more openings in a second wall.

In the third section III, the second region 3101B may be substantially fluidically separated from the first region 3101A and from the third region 3101C. As explained above, it is acknowledged that the second region 3101B in the third section III may be indirectly fluidically coupled to the first and third regions 3101A and 3101C in the third section III along fluidic paths partially extending through the second first and second sections I and II. However, such fluidic paths would not be "in the third section III" as this phrase is used in this context.

In the third section III, at least part of the first region 3101A may be contained within a first passage 3141, at least part of the second region 3101B may be contained within a second passage 3142, and at least part of the third region 3101C may be contained within a third passage 3143. The first, second, and third passages 3141, 3142, and 3143 may be sub-passages of (e.g., within) the main passage 3101 and may each be defined at least in part by walls within the main passage 3101. In the non-limiting and non-exhaustive example depicted, at least part of the third passage 3143 has a columnar (e.g., cylindrical) shape defined at least in part by a first columnar wall and by an external surface (e.g., an outer, insulated layer) of the conductor 3102 or the electrode, at least part of the second passage 3142 has a columnar (e.g., cylindrical) shape defined at least in part by the first columnar wall and by a second columnar wall surrounding the first columnar wall, and at least part of the third passage 3143 has a columnar (e.g., cylindrical) shaped passage defined in part by the second columnar wall and by an internal wall of the main passage 3101. In the non-limiting and non-exhaustive example depicted, the third passage 3143 at least partially surrounds the conductor 3102 or the electrode, the second passage 3142 at least partially surrounds the third passage 3143, and the first passage 3141 at least partially surrounds the second passage 3142. In some examples, extensions of the first, second, and third passages 3141, 3142, and 3143 into the second section II may be at least partially defined by the walls in the second section II. For example, the first, second, and third passages 3141, 3142, and 3143 may be included in the second section II. In some examples, the first and second columnar walls in the second section II have the corresponding one or more openings that are controllably openable and closable via a fluidic separation mechanism, and the first and second columnar walls in the third section III do not have corresponding openings.

In some examples, the first and third passages 3141 and 3143 may be substantially fluidically separated from each other along at least part of the main passage 3101 (e.g., along at least part of the third section III). In some other examples, the first and third passages 3141 and 3143 may be fluidically coupled to each other along at least part of the main passage 3101 (e.g., along at least part of the third section III) even though they may be substantially fluidically separated from the second passage 3142 along the at least part of the main passage 3101. For example, in some examples, the first passage 3141 is at a first side (e.g., a left side) of the main passage 3101, the third passage 3143 is at a second side (e.g., a right side) of the main passage 3101, the second passage 3142 is at least partially between the first and third passages 3141 and 3143, and the first and third passages 3141 and 3143 respectively form at least part of two arms of a U-shaped passage (e.g., a passage having a U-shape in a cross-sectional view of the main passage 3101 along a plane perpendicular to the fluidic path of the main passage 3101) in the third section III at least partially surrounding the second passage 3142. The U-shaped passage may have an intermediate passage forming a base of the U-shape and fluidically coupling the first and third passages 3141 and 3143.

The first and third passages 3141 and 3143 may be fluidically coupled to (e.g., combine or merge to form) a high-salinity passage 3144 at respective distal ends of the first and third passages 3141 and 3143, or be fluidically coupled to a drain reservoir at respective distal ends of the first and third passages 3141 and 3143. In some examples, the first and third passages 3141 and 3143 may be substantially fluidically separated from each other in at least part of the third section III before fluidically coupling to the high-salinity passage 3144. In some other examples, the first and third passages may be fluidically coupled to each other in at least part of the third section III before fluidically coupling to the high-salinity passage 3144. For example, in examples where the main passage 3101 includes the U-shaped passage along at least part of the third section III and including the first and third passages 3141 and 3143, the first and third passages 3141 and 3143 may combine or merge by the U-shaped passage, at a downstream section (e.g., a downstream subsection of the third section III), changing shape (e.g., morphing) into a columnar (e.g., cylindrical) shaped passage defining the high-salinity passage 3144.

The high-salinity passage 3144 may be substantially fluidically separated from the second passage 3142 at least in the third section III. For example, the high-salinity passage 3144 may be configured to discharge a high-salinity portion of the liquid to a drain reservoir 3105, and the second passage 3142 may be a low-salinity passage configured to discharge a low-salinity portion of the liquid to a reservoir configured to hold liquid that is ready for use or to another system for further desalinating or treatment. The high-salinity portion of the liquid may have a salinity that is greater than a salinity of the low-salinity portion of the liquid. In some examples, the high-salinity portion of the liquid has a salinity that is greater than a salinity of the liquid received into the main passage 3101 (e.g., a salinity of the liquid in a source reservoir, such as an ocean, sea, lake, river, etc., that is provided to the main passage 3101), and the low-salinity portion of the liquid has a salinity that is less than the salinity of the liquid received into the main passage 3101.

In some examples, one or more pumps 3104 may be included and configured to pump the liquid through the main passage 3101. In the non-limiting and non-exhaustive example depicted, a pump 3104 is included along the high-salinity passage 3144 and another pump 3104 is included along the second passage 3142.

In some examples, one or more controllable first fluidic separation mechanisms 3111A and one or more controllable second fluidic separation mechanisms 3111B may be respectively provided along the first and third passages 3141 and 3143. The first and second fluidic separation mechanisms 3111A and 3111B may each be configured to substantially fluidically separate adjacent sections (e.g., sub-sections of the third section III) of the main passage 3101 and may each include, for example, a door (e.g., a valve, etc.). In some other examples, the first and second fluidic separation mechanisms 3111A and 3111B are not included.

In the non-limiting and non-exhaustive example depicted, the main passage 3101 includes the first, second, and third sections I, II, and III, but the present disclosure is not limited thereto. The main passage 3101 may include at least one of the first, second, or third sections I, II, or III and may include additional sections. In some examples, the second section II is not included, the first and third sections I and III are included, and the third section III is adjacent (e.g., immediately adjacent) to the first section I. In some other examples, the third section III is not included, the first and second sections I and II are included, and the second section II is adjacent (e.g., immediately adjacent) to the first section I. In some other examples, the first section I is not included, the second and third sections II and III are included, and the third section III is adjacent (e.g., immediately adjacent) to the second section II. In some other examples, the first and third sections I and III are not included, and the second section II is included.

The desalination system 3000 may include a conductor 3102 and/or an electrode. In the non-limiting and non-exhaustive example depicted, the desalination system includes the conductor 3102. The conductor 3102 may be configured, in response to the conductor 3102 carrying an electric current and liquid including ions flowing through the main passage, to cause, at least along part of the fluidic path of the main passage 3101, a concentration of ions of a first charge type in the third region 3101C to be greater than a concentration of ions of the first charge type in the second region 3101B, and a concentration of ions of a second charge type in the first region 3101A to be greater than a concentration of ions of the second charge type in the second region 3101B. In some examples, the conductor 3102 may be configured to cause, at least along part of the fluidic path of the main passage 3101, the concentration of ions of the first charge type in the second region 3101B to be greater than a concentration of ions of the first charge type in the first region 3101A, the concentration of ions of the second charge type in the second region 3101B to be greater than a concentration of ions of the second charge type in the third region 3101C, the concentration of ions of the first charge type in the third region 3101C to be greater than an average concentration of ions of the first charge type in the main passage 3101, and/or the concentration of ions of the second charge type in the first region 3101A to be greater than an average concentration of ions of the second charge type in the main passage 3101.

The conductor 3102 may extend along a path generally corresponding to the fluidic path of the main passage 3101. In some examples, the conductor 3102 may be configured to carry a current $\vec{I}$ along a direction substantially parallel to the water flow $\overrightarrow{WF}$. The conductor 3102 may be positioned at least partially inside the main passage 3101 or at least partially outside the main passage 3101. In some examples, the conductor 3102 may extend along at least part of the first section I, along at least part of the second section II, and/or along at least part of the third section III. The conductor 3102 may extend at least part way along the high-salinity passage 3144.

The conductor 3102 may be configured to, in response to the conductor 3102 carrying the current $\vec{I}$ to generate a magnetic field $\vec{B}$ within the main passage 3101 that causes the ions of the first charge type and the ions of the second charge type to move in opposite directions within the main passage 3101 in a cross-sectional view of the main passage 3101 on a plane perpendicular to the fluidic path of the main passage 3101. For example, the magnetic field $\vec{B}$ may be substantially perpendicular (e.g., within 20 degrees, 15 degrees, 10 degrees, 5 degrees, 2 degrees, 1 degree, or 0.5 degrees from perpendicular) in direction to the water flow $\overrightarrow{WF}$. Because the ions of both the first and second charge types generally flow with the liquid along the fluidic path in the main passage 3101, the ions will have a velocity having a component in the water flow $\overrightarrow{WF}$. direction, and thus, the ions will experience a magnetic force having a component perpendicular to the water flow $\overrightarrow{WF}$. direction. However, because the ions of the first charge type and of the second charge type are oppositely charged, the magnetic force will be oppositely directed (at least for ions at the same general locality) in the cross-sectional plan view.

In the non-limiting and non-exhaustive example depicted, the conductor 3102 extends through the center of the main passage 3101 through the first section I, the second section II, and part of the third section III. The conductor 3102 ceases to extend along the main passage 3101 part way through the high-salinity passage 3144 (e.g., by being directed out of the main passage 3101 through a port or other exit in the main passage configured to allow the conductor 3102 to be guided out of the main passage 3101). In response to the conductor 3102 carrying a current $\vec{I}$, a magnetic field $\vec{B}$ may be generated inside the main passage 3101 around the conductor 3102. The magnetic field $\vec{B}$ may curl around the conductor 3102 and generally be perpendicular to the water flow $\overrightarrow{WF}$. direction. Depending on which direction the current $\vec{I}$ is flowing in the conductor 3102, positively charged ions in the liquid may tend to move towards the first region 3101A or the third region 3101C to form a distribution of positively charged ions that is substantially radially symmetric about the conductor 3102 and increases or decreases, respectively, along the radial direction away from the conductor 3102. Negatively charged ions in the liquid will tend to move towards the third region 3101C or the first region 3101A to form a distribution of negatively charged ions that is substantially radially symmetric about the conductor 3102 and decreases or increases along the radial direction away from the conductor 3102.

During operation of the desalination system 3000, the liquid may flow through the main passage 3101, and the magnetic field $\vec{B}$ may be generated and provided through the main passage 3101 to cause a concentration of ions of the first charge type in the first region 3101A to be greater than a concentration of the ions of the first charge type in the second region 3101B, and to cause a concentration of ions of the second charge type in the third region 3101C to be greater than a concentration of the ions of the second charge type in the second region 3101B. For example, the magnetic field $\vec{B}$ may cause distributions of ions of the first and second charge types to form, as discussed herein, as the liquid flows through the first section I where the second region 3101B may be fluidically coupled to the first and third regions 3101A and 3101C and/or in the second section II where the second region 3101B is controllably fluidically couplable to the first and third regions 3101A and 3101C. As the liquid flows into the third section III, the liquid in the first region 3101A having the high concentration of ions of the first charge type may be moved (e.g., may flow) into the first passage 3141 via a fluidic current of the liquid through the main passage 3101, the liquid in the third region 3101C having the high concentration of ions of the second charge type may be moved (e.g., may flow) into the third passage 3143 via the fluidic current of the liquid, and the liquid in the second region 3101B having low concentrations of ions of the first and second charge types may be moved (e.g., may flow) into the second passage 3142 via the fluidic current of the liquid. The liquid in the first and third passages 3141 and 3143 may then combine in the high-salinity passage 3144 and, for example, discharged into the drain reservoir 3105, while the low-salinity liquid in the second passage 3142 may be discharged for use or for further desalination and/or treatment.

The conductor 3102 may be substantially electrically insulated from the interior of the main passage 3101 such that the conductor 3102 is electrically insulated from the liquid in the main passage 3101. Because a net charge may form in one or more regions of the main passage 3101 during operation, at least some of the walls of the main passage 3101 and/or included in the main passage 3101 (e.g., the walls at least partially forming the first, second, and third passages 3141, 3142, and 3143) may be substantially electrically insulated from the interior of the main passage 3101 such that the walls are substantially electrically insulated from the liquid as the liquid flows through the main passage 3101.

In some examples, the main passage 3101 does not include a membrane (e.g., a filter membrane) in at least one of the first section I, the second section II, or the third section III. In some examples, the main passage 3101 does not include a membrane in at least one of the first region 3101A, the second region 3101B, or the third region 3101C. In some examples, the main passage 3101 does not include a membrane positioned to divide two sections of the main passage 3101 (e.g., does not include a membrane arranged in a plane about perpendicular to the fluidic path of the main passage 3101).

Figure 6:
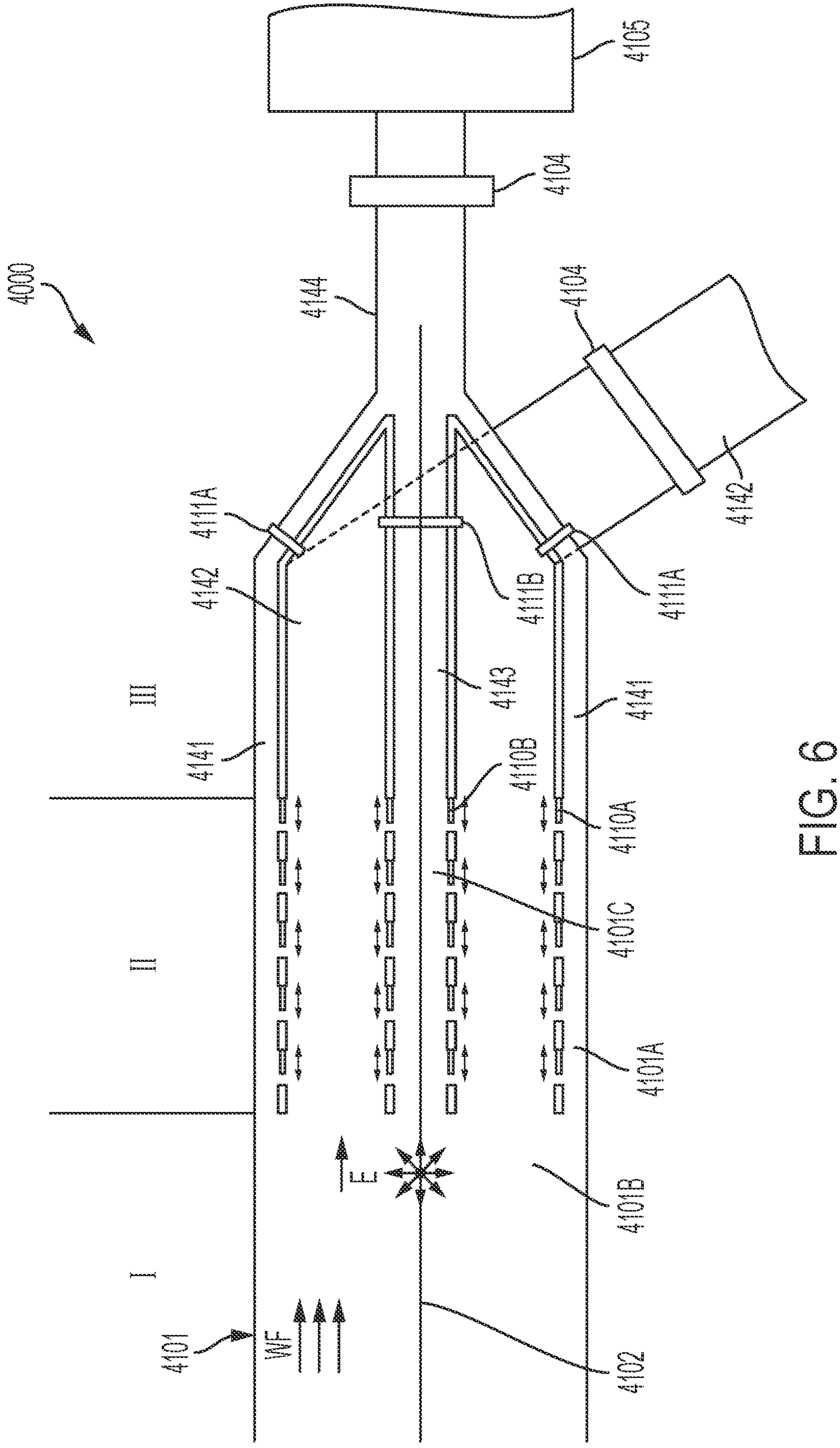
FIG. 6 depicts another desalination system according to some examples.

FIG. 6 depicts another desalination system 4000 according to some examples. The desalination system 4000 may include some features similar to, or the same as, the features of other desalination systems illustrated and described herein, for example, of the desalination systems 1000 and 3000 illustrated in, and described with respect to, FIGS. 1 and 5, respectively. Therefore, redundant descriptions may not be repeated.

The desalination system 4000 may include a main passage 4101 having a first region 4101A, a second region 4101B, and a third region 4101C, and including a first section I, a second section II, and a third section III. In the third section III, at least part of the first region 4101A may be contained within a first passage 4141, at least part of the second region 4101B may be contained within a second passage 4142, and at least part of the third region 4101C may be contained within a third passage 4143. The first and third passages 4141 and 4143 may combine or merge to form a high-salinity passage 4144. The high-salinity passage 4144 may be configured to discharge into a drain reservoir 4105. One or more pumps 4104 may be included and used to pump the liquid through the main passage 4101. One or more first fluidic separation mechanisms 4111A and one or more second fluidic separation mechanisms 4111B may be respectively included along portions of the first and third passages 4141 and 4143.

The desalination system 4000 includes an electrode 4102 configured, in response to holding a charge of a first charge type and liquid including ions flowing through the main passage 4101, to generate an electric field $\vec{E}$ in the main passage 4101, cause a concentration of ions of a second charge type in the third region 4101C to be greater than a concentration of ions of the second charge type in the second region 4101B, and/or to cause a concentration of ions of the first charge type in the first region 4101A to be greater than a concentration of ions of the first charge type in the second region 4101B. In some examples, the desalination system 4000 may the same or similar to the desalination system 3000, except that the electrode 4102 may be utilized to control movement of the ions in the liquid instead of the conductor 3102, for example, in the same or similar manner as the second electrode 2102B is utilized to control movement of ionic particles in the desalination system 2000 of FIG. 4.

In some examples, the electrode 4102 is configured, in response to holding the charge of the first charge type and the liquid flowing through the main passage 4101, to cause a concentration of the ions of the second charge type in the second region 4101B to be greater than a concentration of the ions of the second charge type in the first region 4101A, to cause a concentration of the ions of the first charge type in the second region 4101B to be greater than a concentration of ions of the first charge type in the third region 4101C, to cause the concentration of the ions of the second charge type in the third region 4101C to be greater than an average concentration of the ions of the second charge type in the main passage 4101, and/or to cause the concentration of ions of the first charge type in the first region 4101A to be greater than an average concentration of ions of the first charge type in the main passage 4101.

The electrode 4102 may be positioned at least partly inside the main passage 4101 or at least partially outside the main passage 4101. The electrode 4102 may generally extend along the fluidic path of main passage 4101 and may be at least partially in the first section I, at least partially in the second section II, and/or at least partially in the third section III.

In the non-limiting and non-exhaustive example depicted, the electrode 4102 is positioned at least partially in the main passage 4101 and extends along the fluidic path of the main passage 4101 at least partially through first section I, at least partially through the second section II, at least partially through the third section III and part way through the high-salinity passage 4144. In some examples, the electrode 4102 may be a first electrode, and the desalination system may include a second electrode at least partially outside the main passage 4101 and at least partially surrounding the main passage 4101, for example, in a manner similar to, or the same as, the manner in which the first electrode 2102A at least partly surrounds the main container 2101 in the desalination system 2000 depicted in FIG. 4. During operation, the first electrode and the second electrode may hold opposite charges.

Although FIGS. 5 and 6 depict a conductor 3102 and an electrode 4102, respectively, in some examples, the desalination system 3000 may include a plurality of conductors, and the desalination system 4000 may include a plurality of electrodes.

Figure 7:
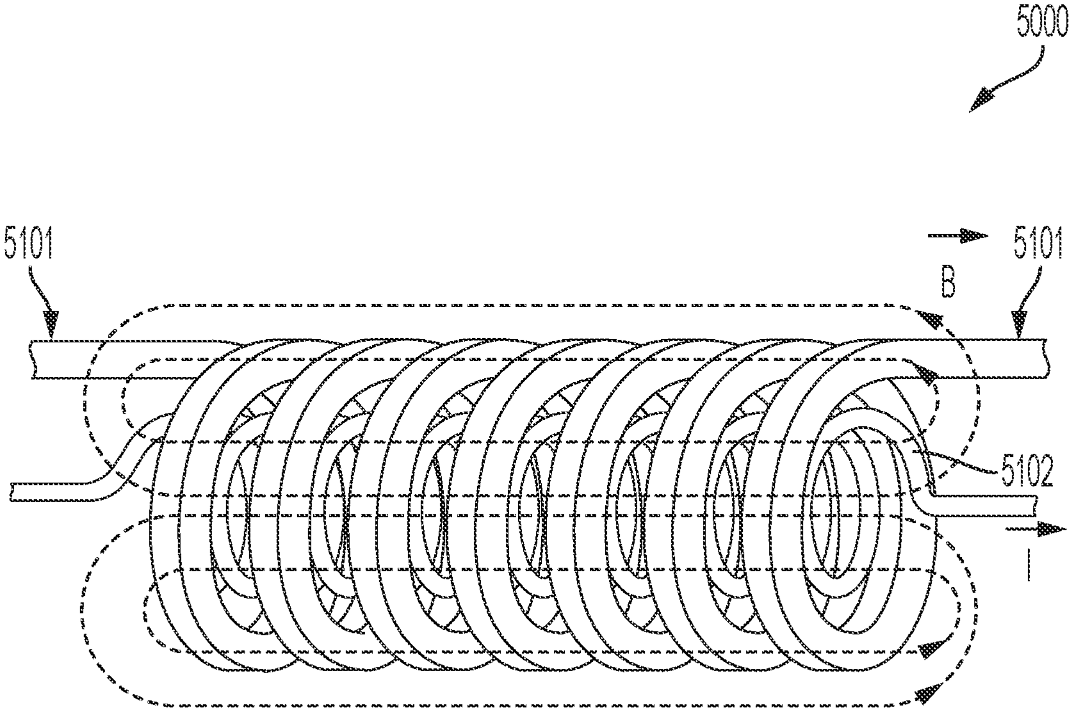
FIG. 7 depicts a side view of another desalination system according to some examples.
Figure 8:
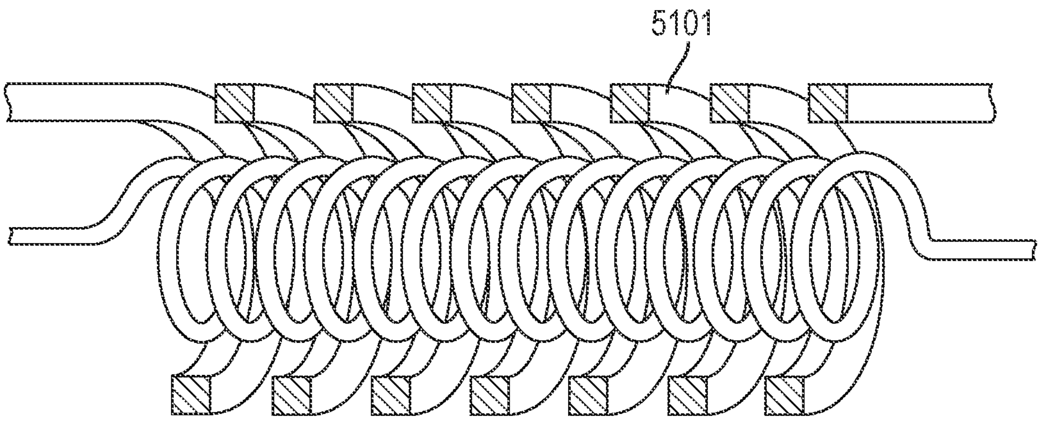
FIG. 8 depicts another side view of the desalination system of FIG. 7 without a front half of a portion of a main passage of the desalination system.
Figure 9:
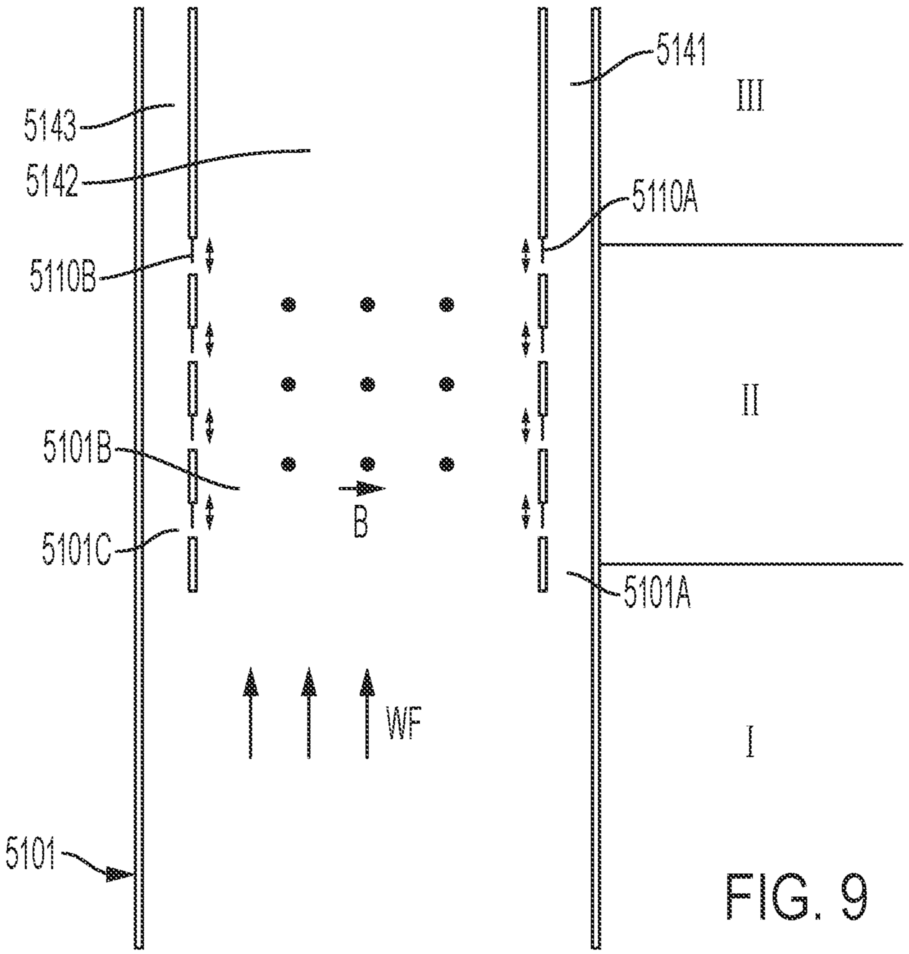
FIG. 9 depicts a part of the main passage of the desalination system of FIG. 7, where the main passage is depicted as straightened out for convenience of illustration.

FIG. 7 depicts a side view of another desalination system 5000 according to some examples. FIG. 8 depicts another side view of the desalination system 5000 of FIG. 7 without a front half of a portion of a main passage 5101 of the desalination system 5000. FIG. 9 depicts a part of the main passage 5101 of the desalination system of FIG. 7, where the main passage 5101 is depicted as straightened out for convenience of illustration. The desalination system 5000 may include some features similar to, or the same as, the features of other desalination systems illustrated and described herein, for example, of the desalination systems 1000 and 3000 illustrated in, and described with respect to, FIGS. 1 and 5, respectively. Accordingly, redundant descriptions may not be repeated.

Referring concurrently to FIGS. 7-9, the desalination system 5000 may include a main passage 5101 and a conductor 5102. The main passage 5101 may have a first region 5101A, a second region 5101B, and a third region 5101C, and may include a first section I, a second section II, and a third section III. At least a portion of the main passage 5101 (e.g., a portion including at least part of the first section I, at least part of the second section II, and/or at least part of the third section III) may have a coil shape whereby the portion of the main passage 5101 is wound one or more times.

The conductor 5102 may be configured to carry a current $\vec{I}$ and, in response to carrying the current $\vec{I}$, to generate a magnetic field $\vec{B}$. At least a portion of the conductor 5102 may be wound into a solenoid coil defining a conductor coil axis. The conductor 5102 may be at least partially positioned within the coil-shaped portion of the main passage 5101 such that, in response to the the conductor 5102 carrying a current $\vec{I}$, the magnetic field $\vec{B}$ is oriented inside the coil-shaped portion of the main passage 5101 substantially perpendicularly (e.g., within 30 degrees, within 20 degrees, within 10 degrees, within 5 degrees, within 2 degrees, within 1 degree, or within 0.5 degrees from perpendicular, for example, on average over the main passage 5101) to the water flow $\overrightarrow{WF}$ direction, as shown in FIG. 9, which shows the magnetic field $\vec{B}$ propagating through the main passage 5101 out of the page and substantially perpendicularly to the water flow $\overrightarrow{WF}$ direction. In some examples, the current $\vec{I}$ may be reversed and the magnetic field $\vec{B}$ may propagate substantially into the page in the view of FIG. 9. In the view of FIG. 9, ions may generally move and/or concentrate leftward or rightward depending on their charge type.

During operation, and in the view of FIG. 9, a concentration of ions of a first charge type may increase in the first region 5101A at a right side of the main passage 5101 as the liquid flows through the first section I and/or the second section II, and a concentration of ions of a second charge type may build up in the third region 5101C at the left side of the main passage 5101 as the liquid flows through the first section I and/or the second section II. Concentrations of the ions of the first and second charge types may be decreased in the second region 5101B as the liquid moves through the first section I and/or the second section II. As the liquid continues to flow through the main passage 5101 into the third section III, the liquid in the first and third regions 5101A and 5101C respectively having the high concentrations of first and second charge type ions may respectively flow through first and third passages 5141 and 5143, and the liquid in the second region 5101B may flow through a second passage 5142 substantially fluidically separated from the first and third passages 5141 and 5143 in the third section III. The first and third passages 5141 and 5143 may combine to form a high-salinity passage (not shown in FIG. 9) to carry off a portion of the liquid having a relatively high salinity (e.g., relative to an average salinity of the liquid when received into the main passage 5101), and the second passage 5142 may carry off a portion of the liquid having a relatively low salinity (e.g., relative to the average salinity of the liquid when received into the main passage 5101 and/or relative to the salinity of the portion of the liquid in the high-salinity passage).

Figure 10:
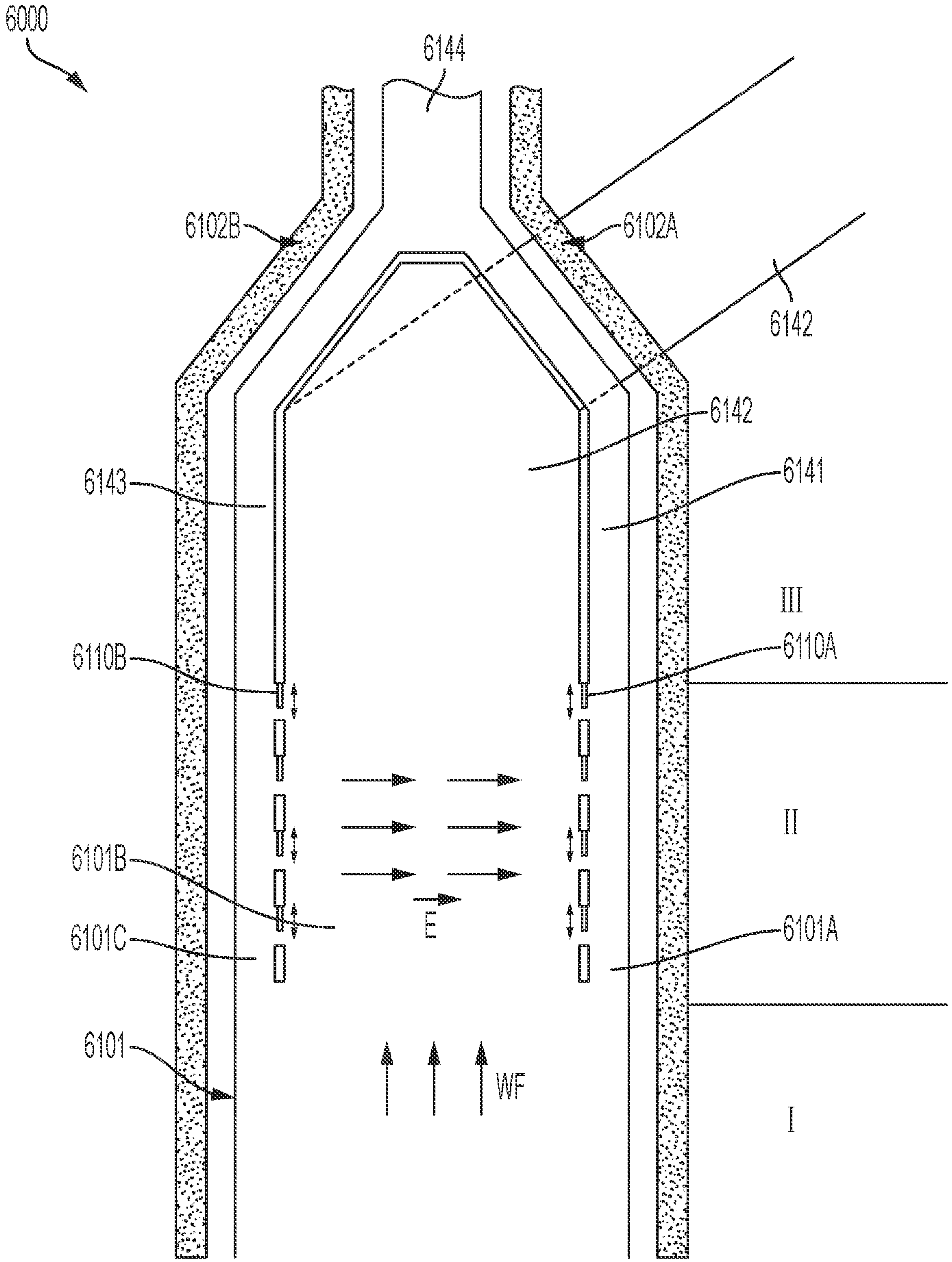
FIG. 10 depicts another desalination system according to some examples.

FIG. 10 depicts another desalination system 6000 according to some examples. The desalination system 6000 may include some features similar to, or the same as, the features of other desalination systems illustrated and described herein, for example, of the desalination systems 1000 and 5000 illustrated in, and described with respect to, FIGS. 1 and 9. Accordingly, redundant descriptions may not be repeated.

The desalination system 6000 may include a main passage 6101 having a first region 6101A, a second region 6101B, and a third region 6101C, and including a first section I, a second section II, and a third section III. The first region 6101A, the second region 6101B, and the third region 6101C may respectively be at a first side (e.g., right side), a center, and a second side (e.g., left side) of the main passage 6101. The first region 6101A, the second region 6101B, and the third region 6101C may respectively be at least partially contained within a first passage 6141, a second passage 6142, and a third passage 6143 in the third section III and, in some examples, in the second section II. In the third section III, the second passage 6142 may be substantially fluidically separated from the first and third passages 6141 and 6143. The first and third passages 6141 and 6143 may combine to form a high-salinity passage 6144 that is substantially fluidically separated from the second passage 6142.

A first electrode 6102A and a second electrode 6102B may be included and configured, in response to the first and second electrodes 6102A and 6102B respectively holding charges of a first charge type and of a second charge type and the liquid flowing through the main passage 6101, to cause a concentration of ions of the second charge type in the first region 6101A to be greater than a concentration of ions of the second charge type in the second region 6101B, and to cause a concentration of ions of the first charge type in the third region 6101C to be greater than a concentration of ions of the first charge type in the second region 6101B.

In some examples, the first electrode 6102A may be positioned at a right side of the main passage 6101 and the second electrode 6102B may be positioned at a left side of the main passage 6101. The first and second electrodes 6102A and 6102B may generally extend along the fluidic path of the main passage 6101, for example, along at least part of the first section I, along at least part of the second section II, and/or along at least part of the third section III.

During operation, concentrations of the ions of the first charge type and of the second charge type may build up in the third region 6101C and in the first region 6101A, respectively, via an electric field $\vec{E}$ generated by the first electrode 6102A and/or the second electrode 6102B and as the liquid flows through the first section I and/or the second section II. As the liquid flows through the third section III, the portions of the liquid in the first and third regions 6101A and 6101C respectively having high concentrations of ions of the second and first charge types may respectively flow through the first and third passages 6141 and 6143 and combine in the high-salinity passage 6144 to form a high-salinity liquid. As the liquid flows through the third section III, the portion of the liquid in the second region 6101B have relatively low concentrations of ions of the first and second charge types may flow through the second passage 6142 that may be substantially fluidically separated from the high-salinity passage 6144.

Figure 11:
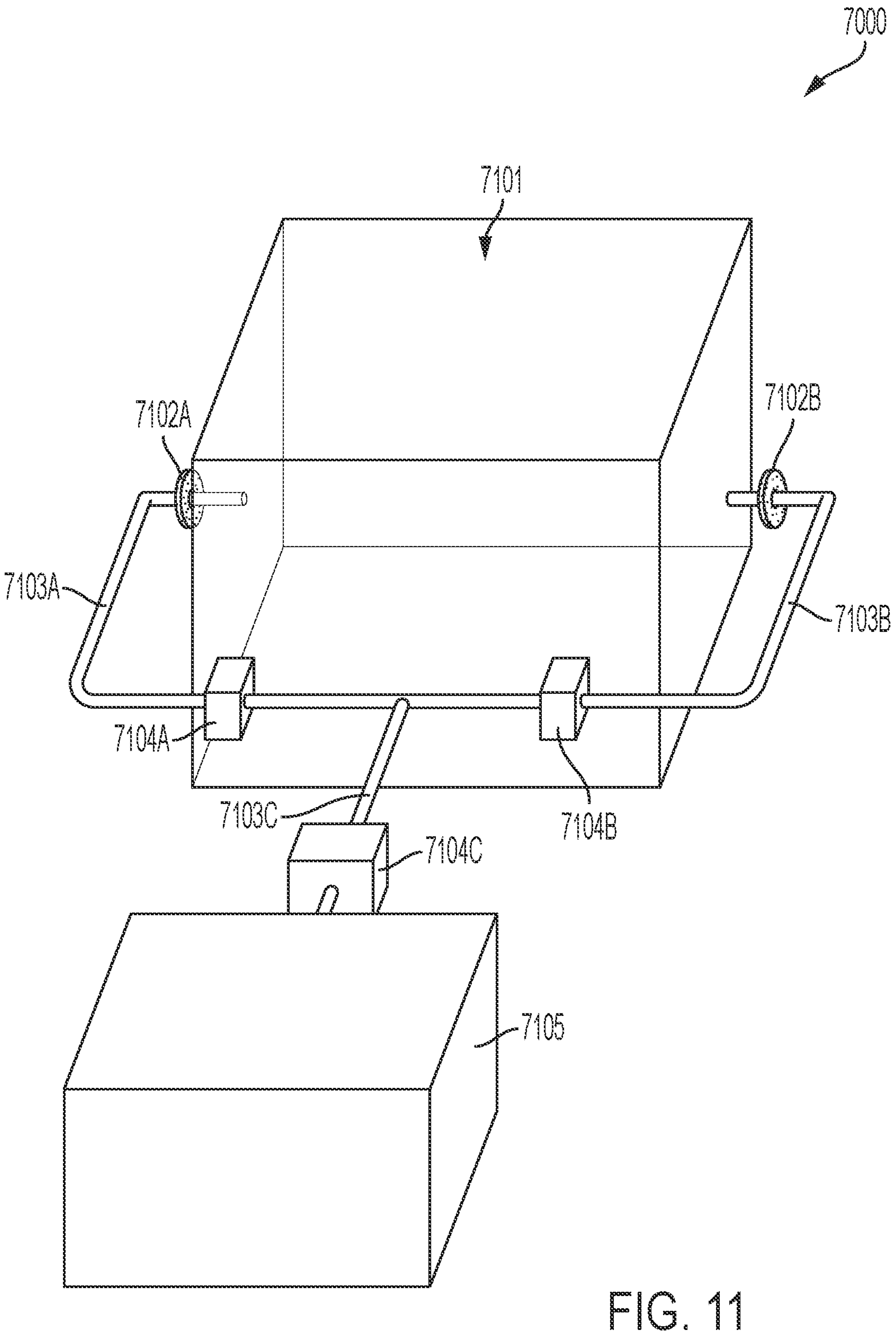
FIG. 11 depicts a perspective view of another desalination system according to some examples.

FIG. 11 depicts a perspective view of another desalination system 7000 according to some examples. The desalination system 7000 may include some features similar to, or the same as, the features of other desalination systems illustrated and described herein, for example, of the desalination system 1000 illustrated in, and described with respect to, FIG. 1. Accordingly, redundant descriptions may not be repeated.

The desalination system 7000 may include a main container 7101 configured to contain a liquid, a first electrode 7102A, a second electrode 7102B, a first passage 7103A, a second passage 7103B, a third passage 7103C, and a pump 7104 configured to pump the liquid from the main container 7101 through the first and second passages 7103A and 7103B.

The main container 7101 may be a fluidically closed container or a main passage configured for liquid to flow through the main passage. In the non-limiting and non-exhaustive example depicted, the main container 7101 is a fluidically closed container.

The first and second passages 7103A and 7103B may be fluidically coupled to the main container 7101 at respective proximal ends of the first and second passages 7103A and 7103B. The first and second passages 7103A and 7103B may be fluidically coupled at their respective distal ends to (e.g., may combine to form) the third passage 7103C, or may be fluidically coupled to a drain reservoir 7105 at the respective distal ends of the first and second passages 7103A and 7103B. In the non-limiting and non-exhaustive example depicted, the first and second passages 7103A and 7103B combine to form the third passage 7103C. The third passage 7103C may be fluidically coupled to the drain reservoir 7105 and configured to discharge liquid into the drain reservoir 7105.

The first electrode 7102A may be configured, in response to holding a charge of a first charge type and the main container 7101 containing a liquid including ions, to cause a concentration of ions of a second charge type at the proximal end of the first passage 7103A and/or in the first passage 7103A to be greater than an average concentration of ions of the second charge type in the main container 7101. The second electrode 7102B may be configured, in response to holding a charge of the second charge type and the main container 7101 containing the liquid including ions, to cause a concentration of ions of the first charge type at the proximal end of the second passage 7103B and/or in the second passage 7103 to be greater than an average concentration of ions of the first charge type in the main container 7101. In some examples, the first electrode 7102A may (by itself and/or in conjunction with the second electrode 7102B) be configured to cause, via an electric field, the concentration of the ions of the first charge type at the proximal end of the second passage 7103B and/or in the second passage 7103B to be greater than the average concentration of the ions of the first charge type in the main container 7101. In some examples, the second electrode 7102B may (by itself and/or in conjunction with the first electrode 7102A) be configured to cause, via an electric field, the concentration of the ions of the second charge type at the proximal end of the first passage 7103A and/or in the first passage 7103A to be greater than the average concentration of the ions of the second charge type in the main container.

In some examples, the first electrode 7102A may be positioned at or proximal to the proximal end of the first passage 7103A, and the second electrode 7102B may be positioned at or proximal to the proximal end of the second passage 7103B. For example, the first electrode 7102A may be positioned at a first side of the main container 7101 and adjacent to the first passage 7103A, and the second electrode 7102B may be positioned at a second side of the main container 7101 and adjacent to the second passage 7103B.

The first electrode 7102A and/or the second electrode 7102B may be at least partially outside of the main container 7101 and/or at least partially inside the main container 7101. The first and second electrodes 7102A and 7102B may be respectively at least partially outside the first and second passages 7103A and 7103B and/or respectively at least partially inside the first and second passages 7103A and 7103B.

The first electrode 7102A and/or the second electrode 7102B may be substantially electrically insulated from the interior of the main container 7101 and from the interior of the first and second passages 7103A and 7103B, respectively, so as to be substantially electrically insulated from the liquid during the desalination process. For example, the first and second electrodes 7102A and 7102B may each be capacitively coupled to the interior of the main container 7101. In some examples, the first and second electrodes 7102A and 7102B may have a configuration similar to, or the same as, the configuration of the first and second electrodes 1102A and 1102B of the desalination system 1000 of FIG. 1, respectively, or the configuration of the first and second electrodes 2102A and 2102B of the desalination system 2000 of FIGS. 2-4.

In some examples, the first electrode 7102A may be omitted. In some other examples, the second electrode 7102B may be omitted. In some examples, the desalination system 7000 may include a plurality of first electrodes including the first electrode 7102A and configured in a similar or same manner as the first electrode 7102A is configured. In some examples, the desalination system 7000 may include a plurality of second electrodes including the second electrode 7102B and configured in a similar or same manner as the second electrode 7102B is configured.

The internal walls of the main container 7101 may be at least partially and/or substantially electrically insulated from the interior of the main container 7101. For example, the internal walls of the main container 7101 may include an insulating material, or the internal walls of the main container 7101 may be at least partially and/or substantially covered by an insulating layer or coating. The internal walls of the first and second passages 7103A and 7103B may be at least partially and/or substantially electrically insulated from their respective interiors in a similar or same manner as the internal walls of the main container 7101 are at least partially and/or substantially electrically insulated from the interior of the main container 7101.

In some examples, a path (e.g., a virtual line) entirely within the main container 7101 and extending from the proximal end of the first passage 7103A to the proximal end of the second passage 7103B that does not pass through a membrane is definable. For example, no membrane (e.g., filter membrane) may be provided in the main container 7101. In some examples, no membrane is included in the first passage 7103A and/or in the second passage 7103B. In some other examples, one or more membranes may be included in the main container 7101, in the first passage 7103A, and/or in the second passage 7103B.

During operation, the first and second electrodes 7102A and 7102B may respectively hold charges of a first charge type and of a second charge type, and may generate an electric field inside the main container 7101 that causes ions of a second charge type to move towards the first electrode 7102A and to cause ions of the first charge type to move towards the second electrode 7102B. An increased concentration of the ions of the second charge type may thereby be formed locally within the main container 7101 at the proximal end of the first passage 7103A, and an increased concentration of the ions of the first charge type may be formed locally within the main container 7101 at the proximal end of the second passage 7103B. As the pump 7104 pulls liquid from the container 7101 through the first and second passages 7103A and 7103B, liquid having a concentration of ions of the second charge type greater than the average concentration of ions of the second charge type in the main container 7101 will move through the first passage 7103A, liquid having a concentration of ions of the first charge type greater than the average concentration of ions of the first charge type in the main container 7101 will move through the second passage 7103B, and the portions of liquid moving through the first and second passages 7103A and 7103B may combine in the third passage 7103C and/or in the drain reservoir 7105. Concentrations of the ions of the first and second charge types in the main container 7101 may therefore steadily decrease, and thus, the salinity the liquid in the main container 7101 will steadily decrease.

Because the liquid in the first and second passages 7103A and 7103B may each hold a net charge opposite to the charge held by the second and first electrodes 7102B and 7102A, respectively, the ions in the first and second passages 7103A and 7103B may resist moving through their respective passages due to their attraction to the charged second and first electrodes 7102B and 7102A. However, another force on the ions provided by the fluidic current of the liquid moving through the first and second passages 7103A and 7103B may tend to push the ions through their respective passages. In a stable state during a desalination process, the concentration of ions of the second and first charge types respectively being discharged from the first passage and second passages 7103A and 7103B will depend on at least the salinity of the liquid in the main container 7101, the charges held by the first and second electrodes 7102A and 7102B, and the flow rate of the liquid through the first and second passages 7103A and 7103B.

Figure 12:
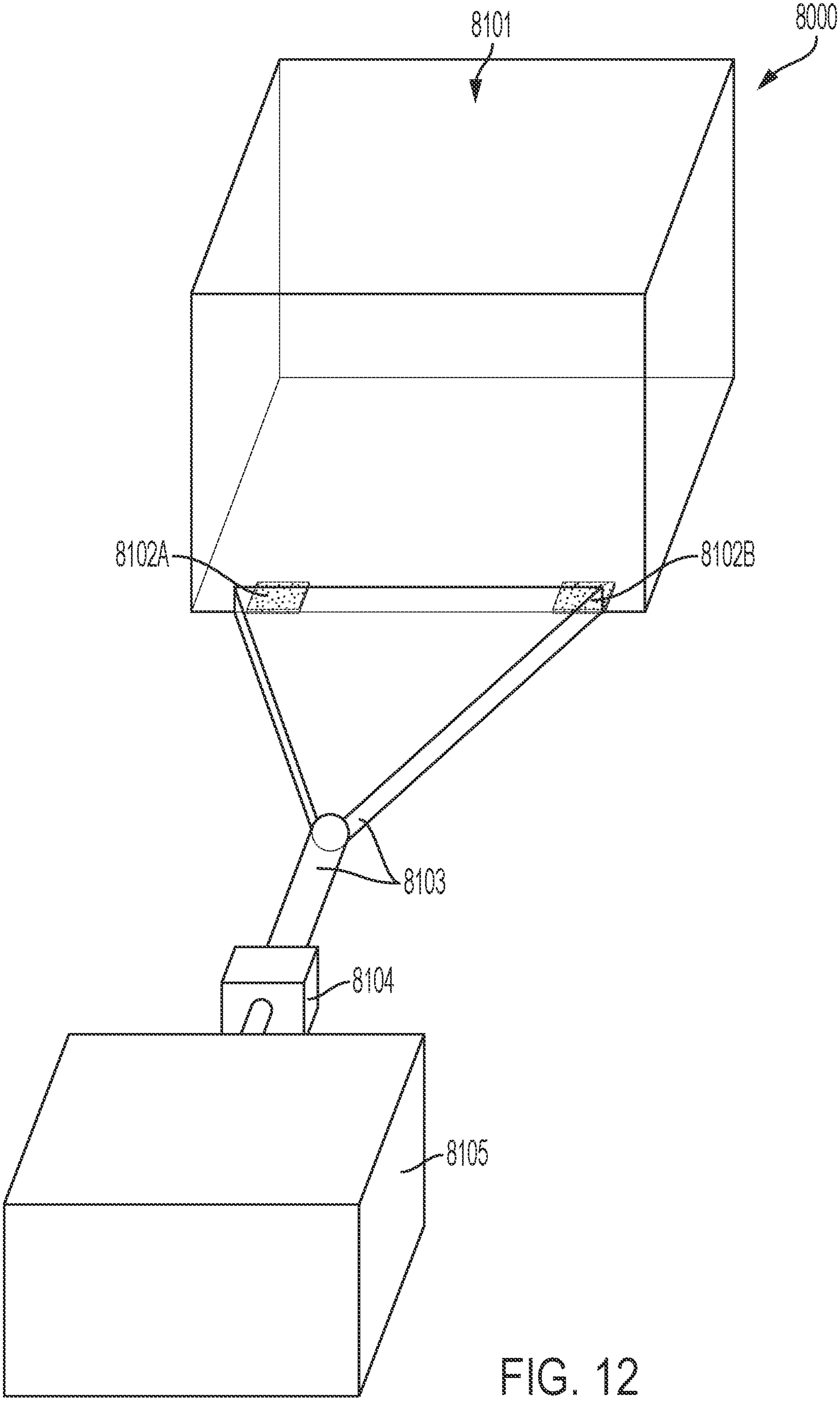
FIG. 12 depicts a perspective view of another desalination system according to some examples.

FIG. 12 depicts a perspective view of another desalination system 8000 according to some examples. The desalination system 8000 may include some features similar to, or the same as, the features of other desalination systems illustrated and described herein, for example, of the desalination systems 1000 and 7000 illustrated in, and described with respect to, FIGS. 1 and 11, respectively. Accordingly, redundant descriptions may not be repeated.

The desalination system 8000 may include a main container 8101, a first electrode 8102A, a second electrode 8102B, a passage 8103, and a pump 8104. The passage 8103 may be fluidically coupled to the main container 8101 at a proximal end of the passage 8103 and fluidically coupled to a drain reservoir 8105 at a distal end of the passage 8103. The first and second electrodes 8102A and 8102B may each be positioned at or proximal to the proximal end of the passage 8103. The first electrode 8102A may be configured, in response to the first electrode 8102A holding a charge of the first charge type and the main container 8101 containing a liquid including ions, to cause a concentration of the ions of a second charge type at the proximal end of the passage 8103 to be greater than an average concentration of the ions of the second charge type in the main container 8101. The second electrode 8102B may be configured, in response to the second electrode 8102B holding a charge of the second charge type and the main container 8101 containing the liquid including the ions, to cause a concentration of the ions of the first charge type at the proximal end of the passage 8103 to be greater than an average concentration of the ions of the first charge type in the main container 8101. The first and second electrodes 8102A and 8102B may be configured, in response to the first and second electrodes respectively holding charges of the first and second charge types and the main container 8101 containing the liquid, to cause an average salinity at the proximal end of the passage 8103 to be greater than an average salinity in the main container 8101. When the first and second electrodes 8102A and 8102B are both proximal to the proximal end of the passage 8103 and are oppositely charged, they may approximate a dipole in the main container 8101. The first and second electrodes 8102A and 8102B will collectively therefore have a lesser influence on attracting ions to the proximal end of the passage 8103 compared to if only one of the first and second electrodes 8102A and 8102B were present, but they will collectively also provide a lesser attractive force to ions in the passage 8103 that causes the ions to resist moving through the passage 8103.

Figure 13:
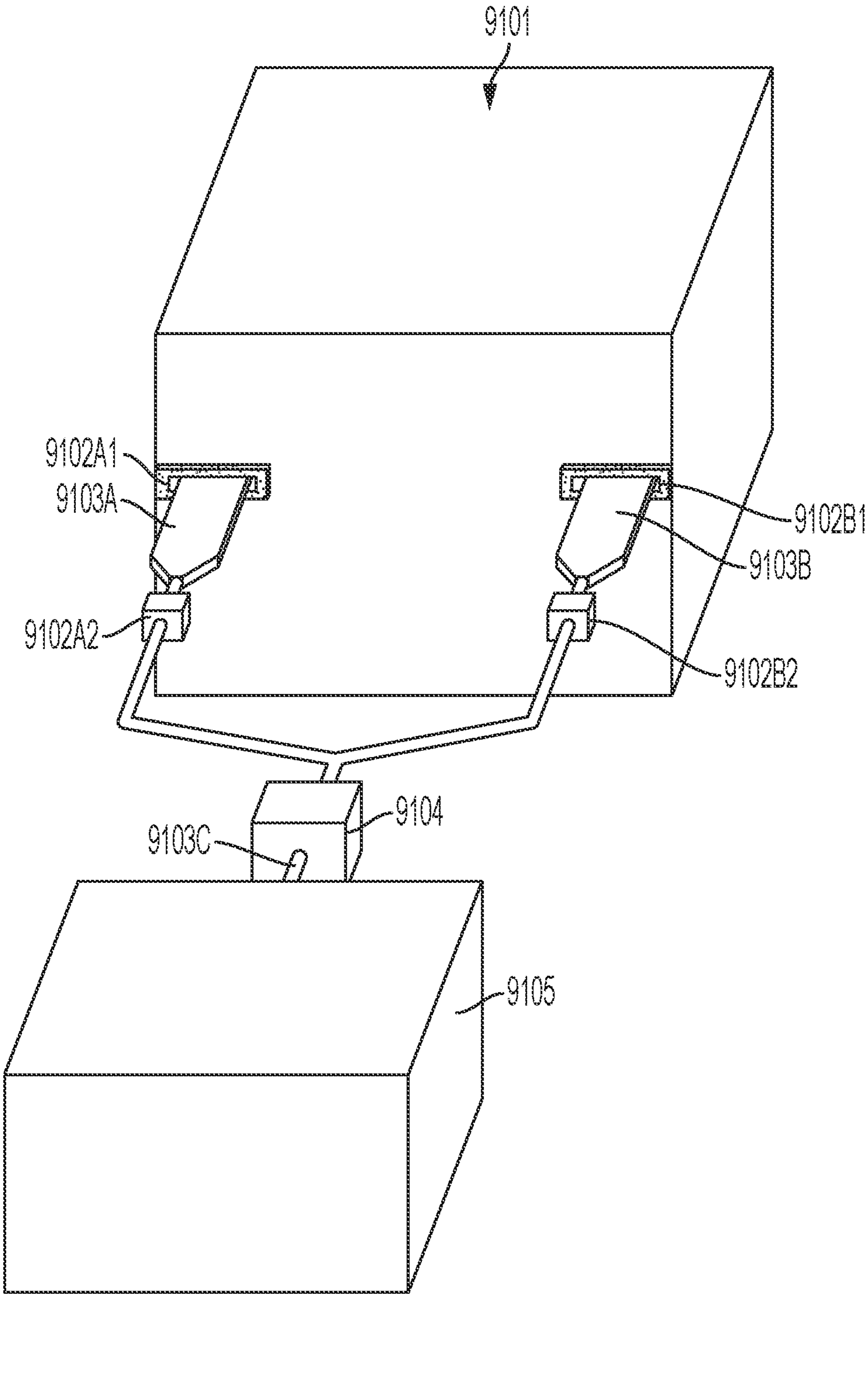
FIG. 13 depicts a perspective view of part of another desalination system according to some examples.

FIG. 13 depicts a perspective view of part of another desalination system 9000 according to some examples. The desalination system 9000 may include some features similar to, or the same as, the features of other desalination systems illustrated and described herein, for example, of the desalination systems 1000 and 7000 illustrated in, and described with respect to, FIGS. 1 and 11, respectively. Accordingly, redundant descriptions may not be repeated.

The desalination system 9000 may include a main container 9101, a first passage 9103A fluidically coupled to the main container 9101 at a proximal end of the first passage 9103A, a second passage 9103B fluidically coupled to the main container 9101 at a proximal end of the second passage 9103B, a third passage 9103C, a first first electrode 9102A1, a second first electrode 9102A2, a second first electrode 9102B1, a second second electrode 9102B2, and a pump 9104. The third passage 9103C may be fluidically coupled to a drain reservoir 9105.

The first passage 9103A may be shaped and sized such that the first passage 9103A at a first position along the first passage 9103A is smaller (e.g., is smaller in breadth, diameter, width, and/or planar area in a plane perpendicular to the fluidic path of the first passage 9103A) than at a second position along the first passage 9103A between the first position of the first passage 9103A and the proximal end of the first passage 9103A (e.g., the proximal end of the first passage 9103A itself). For example, the first passage 9103A may be tapered (e.g., continuously or step-wise tapered) between the proximal end of the first passage 9103A and the first position along the first passage 9103A. By reducing the size of the first passage 9103A, the flow rate (e.g., the magnitude of the fluidic current) of the liquid through the first passage 9103A may be increased, which, as explained above, may increase the concentration of ions of the second charge type in the liquid being discharged from the first passage 9103A. However, because the ions of the second charge type may move generally toward the proximal end of the first passage 9103A, when the first passage 9103A is relatively large at the proximal end of the first passage 9103A where the first passage 9103A receives liquid from the main container 9101, the ions of the second charge type may more easily move into the first passage 9103A compared to when the first passage 9103A is relatively small.

The first first electrode 9102A1 and the second first electrode 9102A2 may be configured, in response to the first first electrode 9102A1 and the second first electrode 9102A2 holding charges of the first charge type and the main container 9101 containing a liquid including ions, to create an electric field in the main container 9101 that causes ions of the second charge type to move toward and into the first passage 9103A. The first first electrode 9102A1 and the second first electrode 9102A2 may be arranged along the first passage 9103A. In some examples, the second first electrode 9102A2 may be positioned closer to the first position along the first passage 9103A than to the second position along the first passage 9103A. For example, the second first electrode 9102A2 may be positioned at the first position along the first passage 9103A. The first first electrode 9102A1 may be positioned at the second position along the first passage 9103A. For example, the first first electrode 9102A1 may be positioned at the proximal end of the first passage 9103A. As explained above, the ions of the second charge type in the first passage 9103A will experience one force from the charged first electrodes 9102A1 and 9102A2 that resists their movement through the first passage and another force from the flow of the liquid through the first passage 9103A that compels the ions of the second charge type to move through the first passage 9103A. By placing the second first electrode 9102A2 closer to the first position along the first passage 9103A, where the first passage 9103A has a reduced size, than to the second position along the first passage 9103A, the ions of the second charge type will be more easily moved through the first passage 9103A to the first position where the first passage 9103A is reduced in size compared to if the second first electrode 9102A2 was positioned closer to the proximal end of the first passage 9103A.

In some examples, the first first electrode 9102A1 is omitted and the second first electrode 9102A2 is included. In some other examples, the first first electrode 9102A1 is included and the second first electrode 9102A2 is omitted. The first and second first electrodes 9102A1 and 9102A2 may have any suitable shape or size. For example, the first first electrode 9102A1 and/or the second first electrode 9102A2 may be elongated and extend at least partially along the first passage 9103A (e.g., from at the proximal end of the first passage 9103A toward, to, and/or past the first position along the first passage 9103A). In some examples, the first first electrode 9102A1 and/or the second first electrode 9102A2 may at least partially surround the first passage 9103A. For example, the first first electrode 9102A1 and/or the second first electrode 9102A2 may have a ring shape or a hollow cylinder shape.

The second passage 9103B may be shaped and sized in any manner that the first passage 9103A may be shaped and sized in, and the second passage 9103B may be shaped and sized differently than, or substantially the same as, the first passage 9103A.

The second first electrode 9102B1 and the second second electrode 9102B2 may be configured (e.g., positioned, positionable, shaped, and/or sized) in any manner that the first first electrode 9102A1 and the second first electrode 9102A2 may be configured in. The second first electrode 9102B1 may be configured different from, or substantially the same as, the first first electrode 9102A1, and the second second electrode 9102B2 may be configured different from, or substantially the same as, the second first electrode 9102A2.

In some other examples, a desalination system may include a main container (e.g., a main passage or a fluidically closed main container) configured to contain a liquid including ions. The main container may include one or more electrodes, one or more passages fluidically coupled to the main container at respective proximal ends, and one or more pumps configured to pull the liquid through the one or more passages from the main container. The one or more electrodes may be configured (e.g., positioned, positionable, shaped, and/or sized), in response to the one or more electrodes holding respective charges and the main container containing a liquid including ions, to cause a concentration of ions of a first charge type and/or a concentration of ions of a second charge type in the liquid at the proximal ends of the one or more passages and/or within the one or more passages to be respectively lower than an average concentration of the ions of the first charge type in the main container and/or a concentration of the ions of the second charge type in the main container. For example, a salinity (e.g., an average salinity) of the liquid at the proximal ends of the one or more passages or within the one or more passages may be less than an average salinity of the liquid in the main container.

For example, a first electrode may be positioned or positionable at a first region (e.g., at a first side) of the main container, a second electrode may be positioned or positionable at a second region (e.g., at a second side) different from the first region, and a proximal end of a passage may be at a third region (e.g., at a third side) of the main container different from the first and second regions of the main container. In some examples, the second region is opposite to the first region, and the third region is at least partially between the first and second regions. In response to the main container containing a liquid including ions, the first electrode holding a charge of a first charge type, and the second electrode holding a charge of a second charge type, the first and second electrodes may be configured to cause concentrations of ions of the second and first charge types to respectively increase in or around the first and second regions, respectively. The salinity of the liquid in or around the third region, including at the proximal end of the passage and/or within the passage, may thereby be decreased, and the liquid in the third region can be at least partially removed from the main container. In some examples, the first electrode or the second electrode is not included. In some examples, the first and second electrodes are at opposite sides of the main container and the proximal end of the passage is between (e.g., about midway between) the first and second electrodes. In some examples, the first and second electrodes are both positioned at a top or bottom of the main container, and the proximal end of the passage is at the bottom or top, respectively, of the main container. In some examples, the proximal end of the passage is positioned such that, in response to the first and second electrodes holding their respective charges, the net charge of the liquid at the proximal end of the passage and/or in the passage is substantially charge neutral.

The desalination system may include some features similar to, or the same as, the features of other desalination systems describe and illustrated herein. For example, the one or more electrodes may be positioned at least partially inside or at least partially outside of the main container; the one or more electrodes may be at least partially and/or substantially electrically insulated from the interior of the main container; the interior walls of the main container and/or the interior walls of the one or more passages may be at least partially and/or substantially electrically insulated; and the main container may include no membranes or may include one or more membranes.

Figure 14:
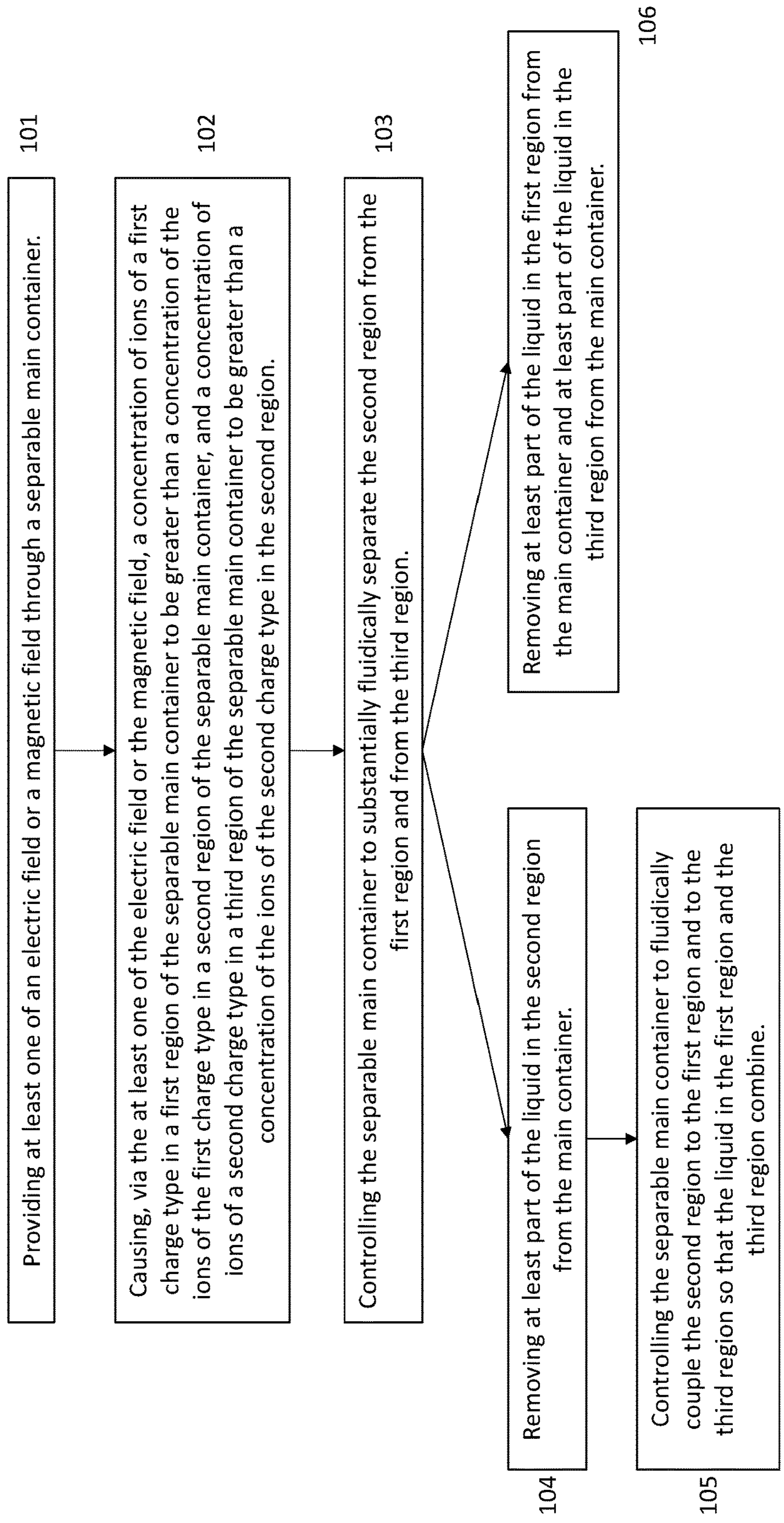
FIG. 14 depicts a desalination method according to some examples.

FIG. 14 depicts a desalination method according to some examples. The desalination method of FIG. 14 may be performed using, for example, any suitable (e.g., compatible) desalination system disclosed herein. Referring to FIG. 14, a desalination method may include a first task 101 of providing at least one of an electric field or a magnetic field through a separable main container. The desalination method may include a second task 102 of causing, via the at least one of the electric field or the magnetic field, a concentration of ions of a first charge type in a first region of the separable main container to be greater than a concentration of the ions of the first charge type in a second region of the separable main container, and a concentration of ions of a second charge type in a third region of the separable main container to be greater than a concentration of the ions of the second charge type in the second region. The desalination method may include a third task 103 of controlling the separable main container to substantially fluidically separate the second region from the first region and from the third region. In some examples, the desalination method may include a fourth task 104 of removing at least part of the liquid in the second region from the main container, and a fifth task 105 of controlling the separable main container to fluidically couple the second region to the first region and to the third region so that the liquid in the first region and the third region combine. In some examples, the desalination method may include a sixth task 106 of removing at least part of the liquid in the first region from the main container and at least part of the liquid in the third region from the main container.

Figure 15:
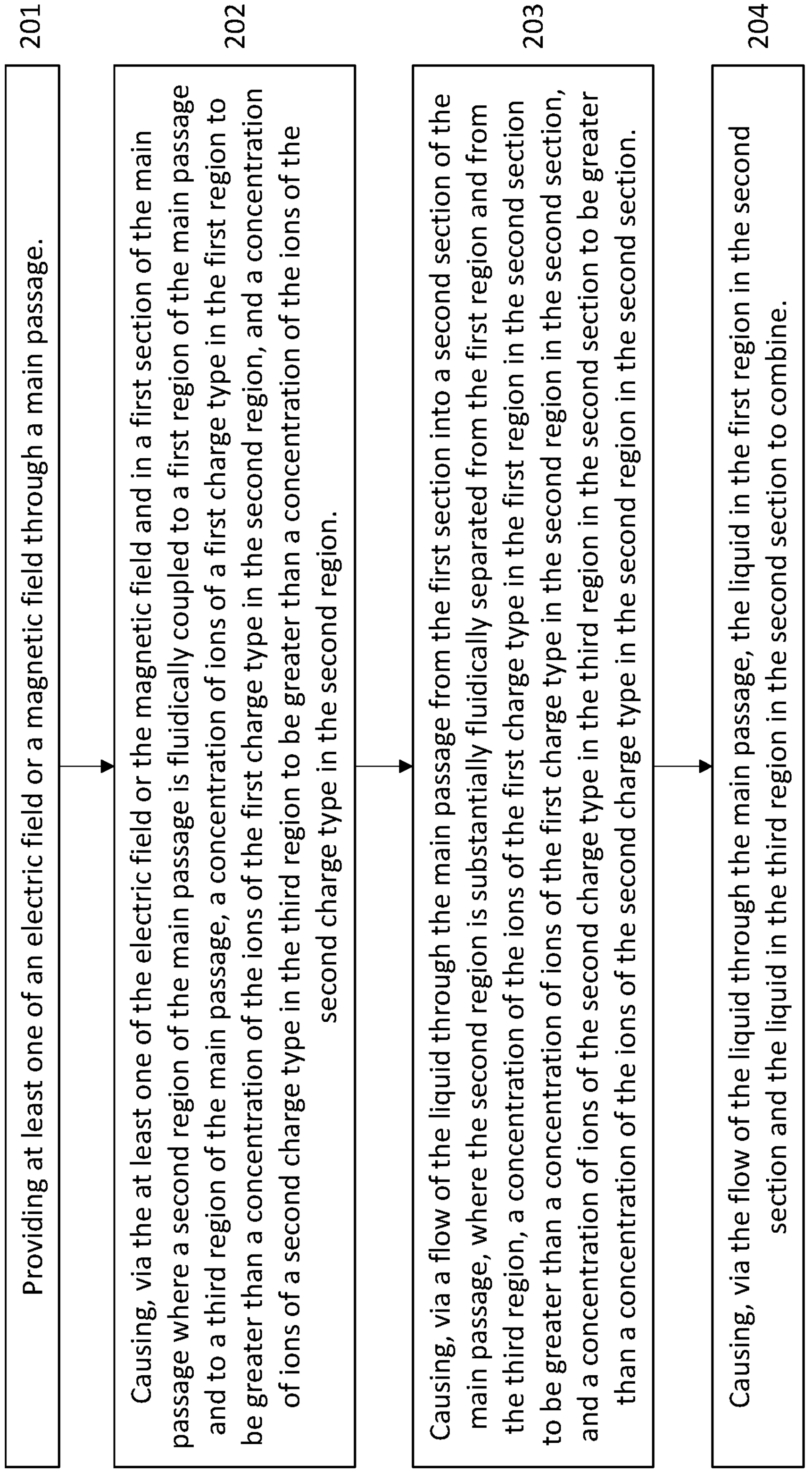
FIG. 15 depicts a desalination method according to some examples.

FIG. 15 depicts a desalination method according to some examples. The desalination method of FIG. 15 may be performed using, for example, any suitable (e.g., compatible) desalination system disclosed herein. Referring to FIG. 15, the desalination method may include a first task 201 of providing at least one of an electric field or a magnetic field through a main passage. The desalination method may include a second task 202 of causing, via the at least one of the electric field or the magnetic field and in a first section of the main passage where a second region of the main passage is fluidically coupled to a first region of the main passage and to a third region of the main passage, a concentration of ions of a first charge type in the first region to be greater than a concentration of the ions of the first charge type in the second region, and a concentration of ions of a second charge type in the third region to be greater than a concentration of the ions of the second charge type in the second region. The desalination method may include a third task 203 of causing, via a flow of the liquid through the main passage from the first section into a second section of the main passage, where the second region is substantially fluidically separated from the first region and from the third region, a concentration of the ions of the first charge type in the first region in the second section to be greater than a concentration of the ions of the first charge type in the second region in the second section, and a concentration of ions of the second charge type in the third region in the second section to be greater than a concentration of the ions of the second charge type in the second region in the second section. The desalination method may include a fourth task 204 of causing, via the flow of the liquid through the main passage, the liquid in the first region in the second section and the liquid in the third region in the second section to combine.

Figure 16:
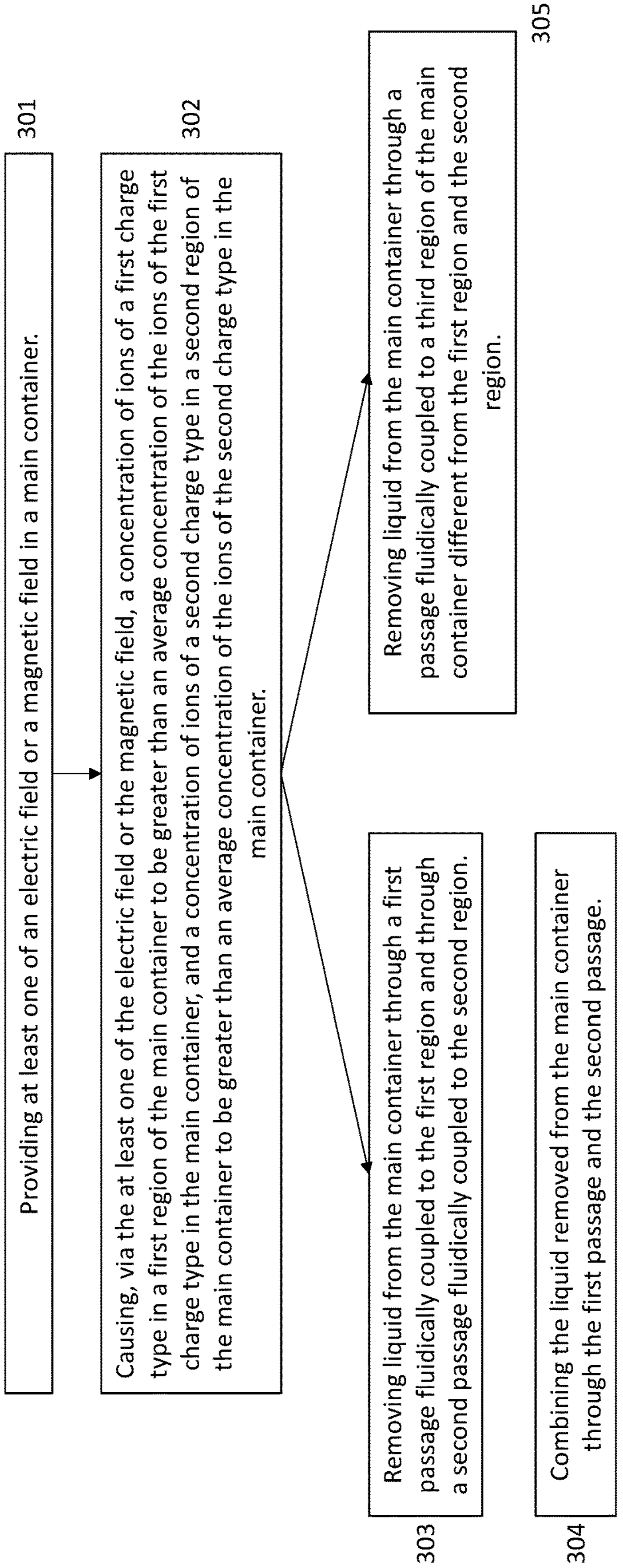
FIG. 16 depicts a desalination method according to some examples.

FIG. 16 depicts a desalination method according to some examples. The desalination method of FIG. 16 may be performed using, for example, any suitable (e.g., compatible) desalination system disclosed herein. Referring to FIG. 16, the desalination method may include a first task 301 of providing at least one of an electric field or a magnetic field in a main container. The desalination method may include a second task 302 of causing, via the at least one of the electric field or the magnetic field, a concentration of ions of a first charge type in a first region of the main container to be greater than an average concentration of the ions of the first charge type in the main container, and a concentration of ions of a second charge type in a second region of the main container to be greater than an average concentration of the ions of the second charge type in the main container. In some examples, the desalination method may include a third task 303 of removing liquid from the main container through a first passage fluidically coupled to the first region and through a second passage fluidically coupled to the second region, and a fourth task 304 of combining the liquid removed from the main container through the first passage and the second passage. In some examples, the desalination method may include a fifth task 305 of removing liquid from the main container through a passage fluidically coupled to a third region of the main container different from the first region and the second region. In some examples, the third region may be a region where a concentration of the ions of the first charge type is less than the average concentration of the ions of the first charge type in the main container and/or where a concentration of the ions of the second charge type is less than the average concentration of the ions of the second charge type in the main container (e.g., a region in which the salinity is less than an average salinity in the main container).

What is claimed is:

1. A desalination system, comprising:

a main passage:

having a first region and a second region, and comprising a first section along a fluidic path of the main passage and a second section along the fluidic path of the main passage, wherein, in the first section of the main passage, the second region is fluidically coupled to the first region, wherein, in the second section of the main passage, the second region is substantially fluidically separated or substantially fluidically separable from the first region, wherein the main passage further has a third region, wherein, in the first section, the third region is fluidically coupled to the second region, wherein, in the second section, the third region is substantially fluidically separated or substantially fluidically separable from the second region, wherein, in the second section, the first region is at least partially contained within a first passage and the third region is at least partially contained within a second passage, wherein the first and second passages are fluidically coupled to a high-salinity passage at respective distal ends of the first and second passages, and wherein the desalination system further comprises:

one or more first electrodes configured, in response to the one or more first electrodes holding a charge of a first charge type and liquid comprising ions flowing through the main passage, to cause a concentration of ions of a second charge type in the first region to be greater than a concentration of ions of the second charge type in the second region, the one or more first electrodes comprising an electrode positioned at least at the high-salinity passage; and one or more second electrodes configured, in response to the one or more second electrodes holding a charge of the second charge type and the liquid comprising ions flowing through the main passage, to cause a concentration of ions of the first charge type in the third region to be greater than a concentration of ions of the first charge type in the second region, the one or more second electrodes comprising an electrode positioned at least at the high-salinity passage.

2. The desalination system of claim 1, wherein the main passage does not include a membrane in at least one of the first region or the second region.

3. The desalination system of claim 1, wherein, in the second section, the second region is at least partially contained within a third passage, and wherein, in the second section, the third passage is substantially fluidically separated from the first passage and from the second passage.

4. The desalination system of claim 1, wherein the one or more first electrodes generally extend along the fluidic path and are positioned at least at the first section and the second section, and wherein the one or more second electrodes generally extending along the fluidic path and are positioned at least at the first section and the second section.

5. The desalination system of claim 1, wherein the one or more first electrodes are configured, in response to the one or more first electrodes holding a charge of the first charge type and the liquid comprising ions flowing through the main passage, to be electrically insulated from the liquid.

6. The desalination system of claim 1, wherein the electrode of the one or more first electrodes positioned at least at the high-salinity passage is positioned on a first side of the high-salinity passage, and wherein the electrode of the one or more second electrodes positioned at least at the high-salinity passage is positioned on a second side of the high-salinity passage different from the first side.

7. The desalination system of claim 4, wherein the one or more first electrodes generally extend along the fluidic path from the first section, along the second section, and at least part way along the high-salinity passage, and wherein the one or more second electrodes generally extend along the fluidic path from the first section, along the second section, and at least part way along the high-salinity passage.

8. The desalination system of claim 1, comprising a pump configured to move liquid through the main passage.

9. The desalination system of claim 3, wherein the third passage is fluidically separate from the high-salinity passage.

10. The desalination system of claim 1, wherein a cross-sectional area of the high-salinity passage at a first position along the high-salinity passage is smaller than a cross-sectional area of a proximal end of the high-salinity passage coupled to the distal ends of the first and second passages.

11. The desalination system of claim 10, wherein the electrode of the one or more first electrodes is positioned at least at the first position along the high-salinity passage.

12. A desalination system, comprising:

a main container;

a first passage, defined by one or more walls surrounding the first passage, fluidically coupled to the main container at a proximal end of the first passage; and a first electrode configured, in response to the first electrode holding a charge of a first charge type and the main container containing a liquid comprising ions, to be substantially electrically insulated from the liquid and to cause a concentration of ions of a second charge type in the first passage to be greater than an average concentration of ions of the second charge type in the main container, wherein a cross-sectional area of the first passage at a first position along the first passage is smaller than a cross-sectional area of the first passage at the proximal end of the first passage, and wherein the one or more walls entirely and directly surround the first passage at the proximal end of the first passage.

13. The desalination system of claim 12, wherein the main container does not include a membrane.

14. The desalination system of claim 12, wherein the first electrode is positioned along the first passage closer to the first position of the first passage than to the proximal end of the first passage.

15. The desalination system of claim 12, comprising:

a second passage, defined by one or more walls surrounding the second passage, fluidically coupled to the main container at a proximal end of the second passage; and a second electrode configured, in response to the second electrode holding a charge of the second charge type and the main container containing the liquid comprising ions, to be substantially electrically insulated from the liquid and to cause a concentration of ions of the first charge type in the second passage to be greater than an average concentration of ions of the first charge type in the main container.

16. The desalination system of claim 12, wherein a cross-sectional area of the first passage tapers along the first passage between the proximal end of the first passage and the first position along the first passage.

17. The desalination system of claim 12, comprising one or more electrodes comprising the first electrode, the one or more electrodes being positioned at the proximal end of the first passage and extending along the first passage from the proximal end of the first passage at least to the first position along the first passage.

18. The desalination system of claim 12, comprising a pump configured to move liquid from the main container into the first passage.

19. The desalination system of claim 12, wherein the main container is a separable main container:

having a first region and a second region fluidically coupled to the first region, and being configured to substantially fluidically separate the second region from the first region via a movable fluidic separation mechanism, wherein the first electrode is configured, in response to the first electrode holding the charge of the first charge type and the separable main container containing the liquid comprising ions, to cause a concentration of ions of the second charge type in the first region to be greater than a concentration of ions of the second charge type in the second region.

20. The desalination system of claim 19, wherein the movable fluidic separation mechanism comprises at least one door configured to substantially fluidically separate the second region from the first region.

21. The desalination system of claim 12, wherein the main container comprises a fluidically closed container.

22. The desalination system of claim 12, wherein the main container comprises a main passage configured for a liquid to flow through the main passage.

* * * * *